US012122205B2

(12) United States Patent
Marking et al.

(10) Patent No.: US 12,122,205 B2
(45) Date of Patent: *Oct. 22, 2024

(54) ACTIVE VALVE FOR AN INTERNAL BYPASS

(71) Applicant: Fox Factory, Inc., Duluth, GA (US)

(72) Inventors: John Marking, El Cajon, CA (US);
Everet Owen Ericksen, Woodland, CA (US); George O'Neal, Scotts Valley, CA (US); Matt McLellan, Fremont, CA (US)

(73) Assignee: Fox Factory, Inc., Duluth, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/203,203

(22) Filed: Nov. 28, 2018

(65) Prior Publication Data
US 2019/0176557 A1 Jun. 13, 2019

Related U.S. Application Data

(60) Continuation-in-part of application No. 16/044,380, filed on Jul. 24, 2018, and a continuation-in-part of
(Continued)

(51) Int. Cl.
*B60G 13/06* (2006.01)
*F16F 9/18* (2006.01)
(Continued)

(52) U.S. Cl.
CPC ............... *B60G 13/06* (2013.01); *F16F 9/185* (2013.01); *F16F 9/46* (2013.01); *F16F 9/462* (2013.01);
(Continued)

(58) Field of Classification Search
CPC ............... B60G 13/06; B60G 2500/11; B60G 2206/41; B60G 2202/24; F16F 9/46;
(Continued)

(56) References Cited

U.S. PATENT DOCUMENTS 435,995 A 9/1890 Dunlop
1,078,060 A 11/1913 Newman
(Continued)

FOREIGN PATENT DOCUMENTS

CN 101468587 A 7/2009
DE 1555311 A1 8/1970
(Continued)

OTHER PUBLICATIONS

Machine translation EP 0403803; Dec. 1990.*
(Continued)

*Primary Examiner* — Abdalla A Khaled

(57) ABSTRACT

A vehicle suspension damper includes: a cylinder and a piston assembly, wherein the piston assembly includes a piston; a working fluid within the cylinder; a bypass cylinder surrounding the cylinder and defining a cylindrical bypass channel; an adjustable bypass port fluidly coupling an interior of the cylinder and the cylindrical bypass channel; and an active bypass valve coupled with the cylindrical bypass channel, the active bypass valve configured to adjust a working size of the adjustable bypass port to modify a flow of said working fluid through the adjustable bypass port.

18 Claims, 7 Drawing Sheets

Related U.S. Application Data application No. 16/042,563, filed on Jul. 23, 2018, now Pat. No. 10,814,689, said application No. 16/044,380 is a continuation of application No. 15/387,236, filed on Dec. 21, 2016, now Pat. No. 10,040,328, said application No. 16/042,563 is a continuation of application No. 15/275,078, filed on Sep. 23, 2016, now Pat. No. 10,040,329, said application No. 15/387,236 is a continuation of application No. 14/487,529, filed on Sep. 16, 2014, now Pat. No. 9,528,565, said application No. 15/275,078 is a division of application No. 14/466,831, filed on Aug. 22, 2014, now Pat. No. 9,452,654, which is a continuation-in-part of application No. 14/251,446, filed on Apr. 11, 2014, now Pat. No. 10,047,817, which is a continuation-in-part of application No. 13/934,067, filed on Jul. 2, 2013, now Pat. No. 10,060,494, which is a continuation-in-part of application No. 13/843,704, filed on Mar. 15, 2013, now Pat. No. 9,033,122, said application No. 14/251,446 is a continuation-in-part of application No. 13/485,401, filed on May 31, 2012, now abandoned, and a continuation-in-part of application No. 13/189,216, filed on Jul. 22, 2011, now Pat. No. 9,239,090, which is a continuation-in-part of application No. 13/175,244, filed on Jul. 1, 2011, now Pat. No. 8,627,932, and a continuation-in-part of application No. 13/010,697, filed on Jan. 20, 2011, now Pat. No. 8,857,580, said application No. 14/251,446 is a continuation-in-part of application No. 12/684,072, filed on Jan. 7, 2010, now abandoned.

(60) Provisional application No. 61/709,041, filed on Oct. 2, 2012, provisional application No. 61/667,327, filed on Jul. 2, 2012, provisional application No. 61/645,465, filed on May 10, 2012, provisional application No. 61/491,858, filed on May 31, 2011, provisional application No. 61/361,127, filed on Jul. 2, 2010, provisional application No. 61/296,826, filed on Jan. 20, 2010, provisional application No. 61/143,152, filed on Jan. 7, 2009.

(51) Int. Cl.
*F16F 9/46* (2006.01)
*F16F 9/06* (2006.01)
*F16F 9/516* (2006.01)

(52) U.S. Cl.
CPC .......... *F16F 9/468* (2013.01); *B60G 2202/24* (2013.01); *B60G 2206/41* (2013.01); *B60G 2500/11* (2013.01); *F16F 9/062* (2013.01); *F16F 9/065* (2013.01); *F16F 9/5165* (2013.01); *F16F 2228/066* (2013.01)

(58) Field of Classification Search
CPC .. F16F 9/185; F16F 9/468; F16F 9/462; F16F 9/5165; F16F 2228/066; F16F 9/065; F16F 9/062
See application file for complete search history.

(56) References Cited

U.S. PATENT DOCUMENTS

| | | | |
|---|---|---|---|
| 1,307,502 A | 6/1919 | Martin | |
| 1,313,763 A | 8/1919 | Thomas | |
| 1,409,849 A | 3/1922 | Haeberlein | |
| 1,468,652 A | 9/1923 | Storey et al. | |
| 1,492,731 A | 5/1924 | Kerr | |
| 1,560,477 A | 11/1925 | Kessler | |
| 1,571,788 A * | 2/1926 | Bramlette, Jr. | F16F 9/54 188/129 |
| 1,575,973 A | 3/1926 | Coleman | |
| 1,655,786 A | 1/1928 | Guerritore et al. | |
| 1,923,011 A | 8/1933 | Moulton | |
| 1,948,600 A | 2/1934 | Templeton | |
| 1,970,239 A | 8/1934 | Klaas | |
| 2,018,312 A | 10/1935 | Moulton | |
| 2,098,119 A | 11/1937 | White | |
| 2,115,072 A | 4/1938 | Hunt et al. | |
| 2,122,407 A | 7/1938 | Chisholm | |
| 2,186,266 A | 1/1940 | Onions | |
| 2,259,437 A | 10/1941 | Dean | |
| 2,354,340 A * | 7/1944 | Utter | D03D 49/38 139/161 F |
| 2,363,867 A | 11/1944 | Isely | |
| 2,492,331 A | 12/1949 | Spring | |
| 2,518,553 A | 8/1950 | Kieber | |
| 2,540,525 A | 2/1951 | Howarth et al. | |
| 2,559,633 A | 7/1951 | Maurice et al. | |
| 2,588,520 A | 3/1952 | Halgren et al. | |
| 2,697,600 A | 12/1954 | Gregoire | |
| 2,705,119 A | 3/1955 | Ingwer | |
| 2,725,076 A | 11/1955 | Hansen et al. | |
| 2,729,308 A | 1/1956 | Koski et al. | |
| 2,778,378 A | 1/1957 | Presnell | |
| 2,784,962 A | 3/1957 | Sherburne | |
| 2,809,722 A | 10/1957 | Smith | |
| 2,838,140 A | 6/1958 | Rasmusson et al. | |
| 2,846,028 A | 8/1958 | Gunther | |
| 2,853,974 A | 9/1958 | Hewitt | |
| 2,879,971 A | 3/1959 | Demay | |
| 2,883,181 A | 4/1959 | Hogan et al. | |
| 2,897,613 A | 8/1959 | Davidson et al. | |
| 2,924,304 A | 2/1960 | Patriquin | |
| 2,941,629 A | 6/1960 | Etienne et al. | |
| 2,967,065 A | 1/1961 | Schwendner | |
| 2,973,744 A | 3/1961 | Hennells | |
| 2,991,804 A | 7/1961 | Merkle | |
| 3,003,595 A | 10/1961 | Patriquin et al. | |
| 3,056,598 A | 10/1962 | Ransom et al. | |
| 3,073,586 A | 1/1963 | Hartel et al. | |
| 3,074,709 A | 1/1963 | Ellis et al. | |
| 3,085,530 A | 4/1963 | Williamson | |
| 3,087,583 A | 4/1963 | Bruns | |
| 3,107,753 A | 10/1963 | Georgette et al. | |
| 3,127,958 A | 4/1964 | Szostak | |
| 3,175,645 A | 3/1965 | Schafer et al. | |
| 3,202,413 A | 8/1965 | Colmerauer | |
| 3,206,153 A | 9/1965 | Burke | |
| 3,207,270 A | 9/1965 | Ellis | |
| 3,216,535 A | 11/1965 | Schultze | |
| 3,238,850 A | 3/1966 | Desmarchelier | |
| 3,284,076 A | 11/1966 | Gibson | |
| 3,286,797 A | 11/1966 | Leibfritz et al. | |
| 3,405,625 A | 10/1968 | Carlson et al. | |
| 3,419,849 A | 12/1968 | Anderson et al. | |
| 3,420,493 A | 1/1969 | Kraft et al. | |
| 3,494,606 A | 2/1970 | Hanchen | |
| 3,528,700 A | 9/1970 | Janu et al. | |
| 3,537,722 A | 11/1970 | Moulton | |
| 3,556,137 A | 1/1971 | Billeter et al. | |
| 3,559,027 A | 1/1971 | Arsem | |
| 3,560,033 A | 2/1971 | Barkus | |
| 3,575,442 A | 4/1971 | Elliott et al. | |
| 3,584,331 A | 6/1971 | Richard et al. | |
| 3,603,575 A | 9/1971 | Arlasky et al. | |
| 3,605,960 A | 9/1971 | Singer | |
| 3,618,972 A | 11/1971 | Buhl | |
| 3,621,950 A | 11/1971 | Lutz | |
| 3,650,033 A | 3/1972 | Behne et al. | |
| 3,701,544 A | 10/1972 | Stankovich | |
| 3,714,953 A | 2/1973 | Solvang | |
| 3,750,856 A | 8/1973 | Kenworthy et al. | |
| 3,784,228 A | 1/1974 | Hoffmann et al. | |
| 3,791,408 A | 2/1974 | Saitou et al. | |
| 3,792,644 A | 2/1974 | Ferguson et al. | |
| 3,795,291 A | 3/1974 | Naito et al. | |

(56) References Cited

U.S. PATENT DOCUMENTS

| | | | |
|---|---|---|---|
| 3,830,482 | A | 8/1974 | Norris |
| 3,842,753 | A | 10/1974 | Ross et al. |
| 3,861,487 | A | 1/1975 | Gill |
| 3,903,613 | A | 9/1975 | Bisberg |
| 3,941,402 | A | 3/1976 | Yankowski et al. |
| 3,981,204 | A | 9/1976 | Starbard et al. |
| 3,981,479 | A | 9/1976 | Foster et al. |
| 3,986,118 | A | 10/1976 | Madigan |
| 3,995,883 | A | 12/1976 | Glaze |
| 4,022,113 | A | 5/1977 | Blatt et al. |
| 4,032,829 | A | 6/1977 | Schenavar et al. |
| 4,036,335 | A | 7/1977 | Thompson et al. |
| 4,045,008 | A | 8/1977 | Bauer |
| 4,072,087 | A | 2/1978 | Mueller et al. |
| 4,103,881 | A | 8/1978 | Simich |
| 4,106,522 | A | 8/1978 | Manesse |
| 4,114,735 | A | 9/1978 | Kato |
| 4,121,610 | A | 10/1978 | Harms et al. |
| 4,131,657 | A | 12/1978 | Ball et al. |
| 4,139,186 | A | 2/1979 | Postema et al. |
| 4,153,237 | A | 5/1979 | Supalla |
| 4,159,106 | A | 6/1979 | Nyman et al. |
| 4,166,612 | A | 9/1979 | Freitag et al. |
| 4,174,098 | A | 11/1979 | Baker et al. |
| 4,183,509 | A | 1/1980 | Nishikawa et al. |
| 4,236,613 | A | 12/1980 | Van Der Lely |
| 4,287,812 | A | 9/1981 | Iizumi |
| 4,291,850 | A | 9/1981 | Sharples |
| 4,305,566 | A | 12/1981 | Grawunde |
| 4,311,302 | A | 1/1982 | Heyer et al. |
| 4,333,668 | A | 6/1982 | Hendrickson et al. |
| 4,334,711 | A | 6/1982 | Mazur et al. |
| 4,337,850 | A | 7/1982 | Shimokura et al. |
| 4,348,016 | A | 9/1982 | Milly |
| 4,351,515 | A | 9/1982 | Yoshida |
| 4,366,969 | A | 1/1983 | Benya et al. |
| 4,387,781 | A | 6/1983 | Ezell et al. |
| 4,437,548 | A | 3/1984 | Ashiba et al. |
| 4,465,299 | A | 8/1984 | Stone et al. |
| 4,474,363 | A | 10/1984 | Numazawa et al. |
| 4,491,207 | A | 1/1985 | Boonchanta et al. |
| 4,500,827 | A | 2/1985 | Merritt et al. |
| 4,502,673 | A | 3/1985 | Clark et al. |
| 4,529,180 | A | 7/1985 | Hill |
| 4,546,959 | A | 10/1985 | Tanno |
| 4,548,233 | A | 10/1985 | Wolfges |
| 4,570,851 | A | 2/1986 | Cirillo et al. |
| 4,572,317 | A | 2/1986 | Isono et al. |
| 4,620,619 | A | 11/1986 | Emura et al. |
| 4,624,346 | A | 11/1986 | Katz et al. |
| 4,630,818 | A | 12/1986 | Saarinen |
| 4,634,142 | A | 1/1987 | Woods et al. |
| 4,647,068 | A | 3/1987 | Asami et al. |
| 4,655,440 | A | 4/1987 | Eckert |
| 4,657,280 | A | 4/1987 | Ohmori et al. |
| 4,659,104 | A | 4/1987 | Tanaka et al. |
| 4,660,689 | A | 4/1987 | Hayashi et al. |
| 4,673,194 | A | 6/1987 | Sugasawa |
| 4,696,489 | A | 9/1987 | Fujishiro et al. |
| 4,709,779 | A | 12/1987 | Takehara |
| 4,723,753 | A | 2/1988 | Torimoto et al. |
| 4,729,459 | A | 3/1988 | Inagaki et al. |
| 4,732,244 | A | 3/1988 | Verkuylen |
| 4,743,000 | A | 5/1988 | Karnopp |
| 4,744,444 | A | 5/1988 | Gillingham |
| 4,750,735 | A | 6/1988 | Furgerson et al. |
| 4,765,648 | A | 8/1988 | Mander et al. |
| 4,773,671 | A | 9/1988 | Inagaki |
| 4,786,034 | A | 11/1988 | Heess et al. |
| 4,802,561 | A | 2/1989 | Knecht et al. |
| 4,806,082 | A | 2/1989 | Schenk |
| 4,815,575 | A | 3/1989 | Murty et al. |
| 4,821,852 | A | 4/1989 | Yokoya |
| 4,826,207 | A | 5/1989 | Yoshioka et al. |
| 4,830,395 | A | 5/1989 | Foley |
| 4,836,578 | A | 6/1989 | Soltis |
| 4,838,306 | A | 6/1989 | Horn et al. |
| 4,838,394 | A | 6/1989 | Lemme et al. |
| 4,846,317 | A | 7/1989 | Hudgens |
| 4,858,733 | A | 8/1989 | Noguchi et al. |
| 4,919,166 | A | 4/1990 | Sims et al. |
| 4,936,423 | A | 6/1990 | Karnopp |
| 4,936,424 | A | 6/1990 | Costa |
| 4,938,228 | A | 7/1990 | Righter |
| 4,949,262 | A | 8/1990 | Buma et al. |
| 4,949,989 | A | 8/1990 | Kakizaki et al. |
| 4,958,706 | A | 9/1990 | Richardson et al. |
| 4,975,849 | A | 12/1990 | Ema et al. |
| 4,984,819 | A | 1/1991 | Kakizaki et al. |
| 4,986,393 | A | 1/1991 | Preukschat et al. |
| 5,027,303 | A | 6/1991 | Witte |
| 5,031,455 | A | 7/1991 | Cline |
| 5,036,934 | A | 8/1991 | Nishina et al. |
| 5,040,381 | A | 8/1991 | Hazen |
| 5,044,614 | A | 9/1991 | Rau |
| 5,060,910 | A | 10/1991 | Iwata et al. |
| 5,060,959 | A | 10/1991 | Davis et al. |
| 5,072,812 | A | 12/1991 | Imaizumi |
| 5,074,624 | A | 12/1991 | Stauble et al. |
| 5,076,404 | A | 12/1991 | Gustafsson |
| 5,080,392 | A | 1/1992 | Bazergui |
| 5,094,325 | A | 3/1992 | Smith |
| 5,105,918 | A | 4/1992 | Hagiwara et al. |
| 5,113,980 | A | 5/1992 | Furrer et al. |
| 5,127,634 | A | 7/1992 | Le Gourvellec |
| 5,152,547 | A | 10/1992 | Davis |
| 5,161,653 | A | 11/1992 | Hare |
| 5,163,742 | A | 11/1992 | Topfer et al. |
| 5,178,242 | A | 1/1993 | Nakamura et al. |
| 5,186,481 | A | 2/1993 | Turner |
| 5,203,584 | A | 4/1993 | Butsuen et al. |
| 5,207,774 | A | 5/1993 | Wolfe et al. |
| 5,230,364 | A | 7/1993 | Leng et al. |
| 5,231,583 | A | 7/1993 | Lizell |
| 5,236,169 | A | 8/1993 | Johnsen et al. |
| 5,246,247 | A | 9/1993 | Runkel |
| 5,248,014 | A | 9/1993 | Ashiba |
| 5,259,487 | A | 11/1993 | Petek et al. |
| 5,263,559 | A | 11/1993 | Mettner |
| 5,265,902 | A | 11/1993 | Lewis |
| 5,275,086 | A | 1/1994 | Stallings, Jr. |
| 5,277,283 | A | 1/1994 | Yamaoka et al. |
| 5,283,733 | A | 2/1994 | Colley |
| 5,284,330 | A | 2/1994 | Carlson et al. |
| 5,293,971 | A | 3/1994 | Kanari |
| 5,295,074 | A | 3/1994 | Williams |
| 5,295,563 | A * | 3/1994 | Bennett .............. B60G 17/0152 188/266.2 |
| 5,297,045 | A | 3/1994 | Williams et al. |
| 5,301,776 | A | 4/1994 | Beck |
| 5,307,907 | A | 5/1994 | Nakamura et al. |
| 5,311,709 | A | 5/1994 | Kobori et al. |
| 5,318,066 | A | 6/1994 | Burgorf et al. |
| 5,328,004 | A | 7/1994 | Fannin et al. |
| 5,346,242 | A | 9/1994 | Karnopp |
| 5,347,186 | A | 9/1994 | Konotchick et al. |
| 5,348,112 | A | 9/1994 | Vaillancourt |
| 5,372,223 | A | 12/1994 | DeKock et al. |
| 5,372,224 | A | 12/1994 | Samonil et al. |
| 5,381,952 | A | 1/1995 | Duprez |
| 5,390,949 | A | 2/1995 | Naganathan et al. |
| 5,392,885 | A | 2/1995 | Patzenhauer et al. |
| 5,396,973 | A | 3/1995 | Schwemmer et al. |
| 5,398,787 | A | 3/1995 | Woessner et al. |
| 5,413,196 | A | 5/1995 | Forster |
| 5,467,280 | A | 11/1995 | Kimura |
| 5,475,593 | A | 12/1995 | Townend |
| 5,480,011 | A | 1/1996 | Nagai et al. |
| 5,485,417 | A | 1/1996 | Wolf et al. |
| 5,487,006 | A | 1/1996 | Kakizaki et al. |
| 5,503,258 | A | 4/1996 | Clarke et al. |
| 5,517,898 | A | 5/1996 | Kim et al. |
| 5,542,150 | A | 8/1996 | Tu |
| 5,551,674 | A | 9/1996 | Johnsen |

(56) References Cited

U.S. PATENT DOCUMENTS

| | | |
|---|---|---|
| 5,553,836 A | 9/1996 | Ericson |
| 5,558,190 A | 9/1996 | Chang |
| 5,566,794 A | 10/1996 | Wiard |
| 5,578,877 A | 11/1996 | Tiemann |
| 5,586,637 A | 12/1996 | Aidlin et al. |
| 5,588,510 A | 12/1996 | Wilke |
| 5,592,401 A | 1/1997 | Kramer |
| 5,597,180 A | 1/1997 | Ganzel et al. |
| 5,598,337 A | 1/1997 | Butsuen et al. |
| 5,601,164 A | 2/1997 | Ohsaki et al. |
| 5,611,413 A | 3/1997 | Feigel |
| 5,634,563 A | 6/1997 | Peng |
| 5,651,433 A | 7/1997 | Wirth et al. |
| 5,657,840 A | 8/1997 | Lizell |
| 5,687,575 A | 11/1997 | Keville et al. |
| 5,697,477 A | 12/1997 | Hiramoto et al. |
| 5,699,885 A | 12/1997 | Forster |
| 5,722,645 A | 3/1998 | Reitter |
| 5,735,372 A | 4/1998 | Hamilton et al. |
| 5,803,443 A | 9/1998 | Chang |
| 5,806,159 A | 9/1998 | Ohnishi et al. |
| 5,810,128 A * | 9/1998 | Eriksson ............ F16F 9/342 188/285 |
| 5,810,384 A | 9/1998 | Iwasaki et al. |
| 5,813,456 A | 9/1998 | Milner et al. |
| 5,813,731 A | 9/1998 | Newman et al. |
| 5,816,281 A | 10/1998 | Mixon |
| 5,818,132 A | 10/1998 | Konotchick et al. |
| 5,826,935 A | 10/1998 | DeFreitas et al. |
| 5,828,843 A | 10/1998 | Samuel et al. |
| 5,829,733 A | 11/1998 | Becker |
| 5,833,036 A | 11/1998 | Gillespie |
| 5,850,352 A | 12/1998 | Moezzi et al. |
| 5,850,896 A | 12/1998 | Tanaka |
| 5,853,071 A | 12/1998 | Robinson |
| 5,872,418 A | 2/1999 | Wischnewskiy |
| 5,884,921 A | 3/1999 | Katsuda et al. |
| 5,937,975 A | 8/1999 | Forster |
| 5,947,238 A | 9/1999 | Jolly et al. |
| 5,952,823 A | 9/1999 | Sprecher et al. |
| 5,954,318 A | 9/1999 | Kluhsman |
| 5,956,951 A | 9/1999 | O'Callaghan |
| 5,957,252 A | 9/1999 | Berthold |
| 5,971,116 A | 10/1999 | Franklin |
| 5,987,368 A | 11/1999 | Kamimae et al. |
| 5,988,330 A | 11/1999 | Morris |
| 5,988,655 A | 11/1999 | Sakai et al. |
| 5,992,450 A | 11/1999 | Parker et al. |
| 5,996,745 A | 12/1999 | Jones et al. |
| 5,996,746 A | 12/1999 | Turner et al. |
| 5,999,868 A | 12/1999 | Beno et al. |
| 6,000,702 A | 12/1999 | Streiter |
| 6,013,007 A | 1/2000 | Root et al. |
| 6,017,047 A | 1/2000 | Hoose |
| 6,029,958 A | 2/2000 | Larsson et al. |
| 6,035,979 A | 3/2000 | Forster |
| 6,050,583 A | 4/2000 | Bohn |
| 6,058,340 A | 5/2000 | Uchiyama et al. |
| 6,067,490 A | 5/2000 | Ichimaru et al. |
| 6,073,536 A | 6/2000 | Campbell |
| 6,073,700 A | 6/2000 | Tsuji et al. |
| 6,073,736 A | 6/2000 | Franklin |
| 6,092,011 A | 7/2000 | Hiramoto et al. |
| 6,092,816 A | 7/2000 | Sekine et al. |
| 6,105,988 A | 8/2000 | Turner et al. |
| 6,112,868 A * | 9/2000 | Graham ............ B60G 17/002 188/318 |
| 6,120,049 A | 9/2000 | Gonzalez et al. |
| 6,131,709 A | 10/2000 | Jolly et al. |
| 6,135,434 A | 10/2000 | Marking |
| 6,141,969 A | 11/2000 | Launchbury et al. |
| 6,151,930 A | 11/2000 | Carlson |
| 6,152,856 A | 11/2000 | Studor et al. |
| 6,157,103 A | 12/2000 | Ohta et al. |
| 6,179,098 B1 | 1/2001 | Hayakawa et al. |
| 6,196,555 B1 | 3/2001 | Gaibler |
| 6,199,669 B1 | 3/2001 | Huang et al. |
| 6,203,026 B1 | 3/2001 | Jones |
| 6,213,263 B1 | 4/2001 | De Frenne |
| 6,215,217 B1 | 4/2001 | Kurosawa et al. |
| 6,217,049 B1 | 4/2001 | Becker |
| 6,219,045 B1 | 4/2001 | Leahy et al. |
| 6,244,398 B1 | 6/2001 | Girvin et al. |
| 6,254,067 B1 | 7/2001 | Yih |
| 6,279,702 B1 | 8/2001 | Koh |
| 6,290,034 B1 | 9/2001 | Ichimaru |
| 6,293,530 B1 | 9/2001 | Delorenzis et al. |
| 6,296,092 B1 | 10/2001 | Marking et al. |
| 6,311,962 B1 | 11/2001 | Marking |
| 6,318,525 B1 | 11/2001 | Vignocchi et al. |
| 6,321,888 B1 | 11/2001 | Reybrouck et al. |
| 6,322,468 B1 | 11/2001 | Wing et al. |
| 6,336,648 B1 | 1/2002 | Bohn |
| 6,343,807 B1 | 2/2002 | Rathbun |
| 6,352,144 B1 | 3/2002 | Brooks et al. |
| 6,359,837 B1 | 3/2002 | Tsukamoto et al. |
| 6,360,857 B1 | 3/2002 | Fox et al. |
| 6,371,262 B1 | 4/2002 | Katou et al. |
| 6,371,267 B1 | 4/2002 | Kao et al. |
| 6,378,816 B1 | 4/2002 | Pfister |
| 6,378,885 B1 | 4/2002 | Ellsworth et al. |
| 6,382,370 B1 | 5/2002 | Girvin |
| 6,389,341 B1 | 5/2002 | Davis |
| 6,390,747 B1 | 5/2002 | Commins |
| 6,394,238 B1 | 5/2002 | Rogala |
| 6,401,883 B1 | 6/2002 | Nyce et al. |
| 6,412,788 B1 | 7/2002 | Ichimaru |
| 6,415,895 B2 | 7/2002 | Marking et al. |
| 6,418,360 B1 | 7/2002 | Spivey et al. |
| 6,427,812 B2 | 8/2002 | Crawley et al. |
| 6,434,460 B1 | 8/2002 | Uchino et al. |
| 6,446,771 B1 | 9/2002 | Sintorn et al. |
| 6,458,060 B1 | 10/2002 | Watterson et al. |
| 6,460,567 B1 | 10/2002 | Hansen et al. |
| 6,467,593 B1 | 10/2002 | Corradini et al. |
| 6,474,454 B2 | 11/2002 | Matsumoto et al. |
| 6,474,753 B1 | 11/2002 | Rieth et al. |
| 6,501,554 B1 | 12/2002 | Hackney et al. |
| 6,502,837 B1 | 1/2003 | Hamilton et al. |
| 6,510,929 B1 | 1/2003 | Gordaninejad et al. |
| 6,520,297 B1 | 2/2003 | Lumpkin et al. |
| 6,527,093 B2 | 3/2003 | Oliver et al. |
| 6,592,136 B2 | 7/2003 | Becker et al. |
| 6,609,686 B2 | 8/2003 | Malizia |
| 6,619,615 B1 | 9/2003 | Mayr et al. |
| 6,623,389 B1 | 9/2003 | Campagnolo |
| 6,648,109 B2 | 11/2003 | Farr et al. |
| 6,651,788 B1 | 11/2003 | Wohlfarth |
| 6,659,240 B2 | 12/2003 | Dernebo |
| 6,659,241 B2 | 12/2003 | Sendrea |
| 6,672,687 B2 | 1/2004 | Nishio |
| 6,701,234 B1 | 3/2004 | Vogelsang et al. |
| 6,732,033 B2 | 5/2004 | LaPlante et al. |
| 6,755,113 B2 | 6/2004 | Shih |
| 6,782,980 B2 | 8/2004 | Nakadate |
| 6,817,454 B2 | 11/2004 | Nezu et al. |
| 6,837,827 B1 | 1/2005 | Lee et al. |
| 6,840,257 B2 | 1/2005 | Dario et al. |
| 6,853,955 B1 | 2/2005 | Burrell et al. |
| 6,857,625 B2 | 2/2005 | Löser et al. |
| 6,863,291 B2 | 3/2005 | Miyoshi |
| 6,883,650 B2 | 4/2005 | Van Wonderen et al. |
| 6,902,513 B1 | 6/2005 | McClure et al. |
| 6,905,203 B2 | 6/2005 | Kremers et al. |
| 6,920,951 B2 | 7/2005 | Song et al. |
| 6,921,351 B1 | 7/2005 | Hickman et al. |
| 6,923,853 B2 | 8/2005 | Kremers et al. |
| 6,935,157 B2 | 8/2005 | Miller |
| 6,952,060 B2 | 10/2005 | Goldner et al. |
| 6,959,906 B2 | 11/2005 | Hoenig et al. |
| 6,959,921 B2 | 11/2005 | Rose |
| 6,966,412 B2 | 11/2005 | Braswell et al. |
| 6,978,871 B2 | 12/2005 | Holiviers |
| 6,978,872 B2 | 12/2005 | Turner |

(56) References Cited

U.S. PATENT DOCUMENTS

| | | |
|---|---|---|
| 6,991,076 B2 | 1/2006 | McAndrews |
| 7,025,367 B2 | 4/2006 | McKinnon et al. |
| 7,076,351 B2 | 7/2006 | Hamilton et al. |
| 7,128,192 B2 | 10/2006 | Fox |
| 7,128,693 B2 | 10/2006 | Brown et al. |
| 7,135,794 B2 | 11/2006 | Kühnel |
| 7,147,207 B2 | 12/2006 | Jordan et al. |
| 7,163,222 B2 | 1/2007 | Becker et al. |
| 7,166,062 B1 | 1/2007 | Watterson et al. |
| 7,166,064 B2 | 1/2007 | Ashby et al. |
| 7,204,466 B2 | 4/2007 | Hsieh |
| 7,208,845 B2 | 4/2007 | Schaefer et al. |
| 7,217,224 B2 | 5/2007 | Thomas |
| 7,234,574 B2 | 6/2007 | Matsunaga et al. |
| 7,234,575 B2 | 6/2007 | Anderfaas et al. |
| 7,234,680 B2 | 6/2007 | Hull et al. |
| 7,243,763 B2 | 7/2007 | Carlson |
| 7,255,210 B2 | 8/2007 | Larsson et al. |
| 7,270,221 B2 | 9/2007 | McAndrews |
| 7,270,222 B1 * | 9/2007 | Aymar .................... F16F 9/461 188/315 |
| 7,287,760 B1 | 10/2007 | Quick et al. |
| 7,289,138 B2 | 10/2007 | Foote et al. |
| 7,292,867 B2 | 11/2007 | Werner et al. |
| 7,293,764 B2 | 11/2007 | Fang |
| 7,299,112 B2 | 11/2007 | LaPlante et al. |
| 7,302,961 B2 | 12/2007 | Martin et al. |
| 7,306,206 B2 | 12/2007 | Turner |
| 7,316,406 B2 | 1/2008 | Kimura et al. |
| 7,320,387 B2 * | 1/2008 | Sendrea ................ B60G 17/08 267/64.22 |
| 7,325,660 B2 | 2/2008 | Norgaard et al. |
| 7,363,129 B1 | 4/2008 | Barnicle et al. |
| 7,374,028 B2 | 5/2008 | Fox |
| 7,397,355 B2 | 7/2008 | Tracy |
| 7,413,062 B2 | 8/2008 | Vandewal |
| 7,413,063 B1 | 8/2008 | Davis |
| 7,415,336 B1 | 8/2008 | Burch et al. |
| 7,422,092 B2 | 9/2008 | Hitchcock et al. |
| 7,441,638 B2 | 10/2008 | Hanawa |
| 7,469,910 B2 | 12/2008 | Münster et al. |
| 7,484,603 B2 | 2/2009 | Fox |
| 7,490,705 B2 | 2/2009 | Fox |
| 7,512,520 B2 | 3/2009 | Sack et al. |
| 7,513,490 B2 | 4/2009 | Robertson |
| 7,523,617 B2 | 4/2009 | Colpitts et al. |
| 7,558,313 B2 | 7/2009 | Feher |
| 7,558,574 B2 | 7/2009 | Feher et al. |
| 7,566,290 B2 | 7/2009 | Lee et al. |
| 7,569,952 B1 | 8/2009 | Bono et al. |
| 7,581,743 B2 | 9/2009 | Graney et al. |
| 7,591,352 B2 | 9/2009 | Hanawa |
| 7,600,616 B2 | 10/2009 | Anderfaas et al. |
| 7,628,259 B2 | 12/2009 | Norgaard et al. |
| 7,628,414 B2 | 12/2009 | Dobson et al. |
| 7,631,882 B2 | 12/2009 | Hirao et al. |
| 7,654,369 B2 | 2/2010 | Murray et al. |
| 7,673,936 B2 | 3/2010 | Hsu et al. |
| 7,684,911 B2 | 3/2010 | Seifert et al. |
| 7,694,785 B2 | 4/2010 | Nakadate |
| 7,694,987 B2 | 4/2010 | McAndrews |
| 7,699,753 B2 | 4/2010 | Daikeler et al. |
| 7,703,585 B2 | 4/2010 | Fox |
| 7,722,056 B2 | 5/2010 | Inoue et al. |
| 7,722,069 B2 | 5/2010 | Shirai |
| 7,726,042 B2 | 6/2010 | Meschan |
| 7,730,906 B2 | 6/2010 | Kleinert et al. |
| 7,736,272 B2 | 6/2010 | Martens |
| 7,764,990 B2 | 7/2010 | Martikka et al. |
| 7,766,794 B2 | 8/2010 | Oliver et al. |
| 7,770,701 B1 | 8/2010 | Davis |
| 7,775,128 B2 | 8/2010 | Roessingh et al. |
| 7,779,974 B2 | 8/2010 | Timoney et al. |
| 7,795,711 B2 | 9/2010 | Sauciuc et al. |
| 7,828,125 B2 | 11/2010 | Sekiya et al. |
| 7,828,126 B2 | 11/2010 | Lun |
| 7,837,213 B2 | 11/2010 | Colegrove et al. |
| 7,840,346 B2 | 11/2010 | Huhtala et al. |
| 7,841,258 B2 | 11/2010 | Komatsu et al. |
| 7,845,602 B1 | 12/2010 | Young et al. |
| 7,857,325 B2 | 12/2010 | Copsey et al. |
| 7,872,764 B2 | 1/2011 | Higgins-Luthman et al. |
| 7,874,567 B2 | 1/2011 | Ichida et al. |
| 7,901,292 B1 | 3/2011 | Uhlir et al. |
| 7,909,348 B2 | 3/2011 | Klieber et al. |
| 7,927,253 B2 | 4/2011 | DeBenedetto et al. |
| 7,931,132 B2 | 4/2011 | Braun |
| 7,931,563 B2 | 4/2011 | Shaw et al. |
| 7,946,163 B2 | 5/2011 | Gartner |
| 7,975,814 B2 | 7/2011 | Soederdahl |
| 8,016,349 B2 | 9/2011 | Mouri et al. |
| 8,021,270 B2 | 9/2011 | D'Eredita |
| 8,042,427 B2 | 10/2011 | Kawakami et al. |
| 8,056,392 B2 | 11/2011 | Ryan et al. |
| 8,069,964 B2 | 12/2011 | Deferme et al. |
| 8,087,676 B2 | 1/2012 | McIntyre |
| 8,091,910 B2 | 1/2012 | Hara et al. |
| 8,104,591 B2 | 1/2012 | Barefoot et al. |
| 8,121,757 B2 | 2/2012 | Extance et al. |
| 8,127,900 B2 | 3/2012 | Noue |
| 8,136,877 B2 | 3/2012 | Walsh et al. |
| 8,141,438 B2 | 3/2012 | Roessingh et al. |
| 8,151,952 B2 | 4/2012 | Lenz et al. |
| 8,191,964 B2 | 6/2012 | Hsu et al. |
| 8,201,476 B2 | 6/2012 | Tsumiyama |
| 8,210,106 B2 | 7/2012 | Tai et al. |
| 8,210,330 B2 | 7/2012 | Vandewal |
| 8,246,065 B1 | 8/2012 | Kodama et al. |
| 8,256,587 B2 | 9/2012 | Bakke et al. |
| 8,256,732 B1 | 9/2012 | Young et al. |
| 8,262,058 B2 | 9/2012 | Kot |
| 8,262,062 B2 | 9/2012 | Kamo et al. |
| 8,262,100 B2 | 9/2012 | Thomas |
| 8,265,825 B2 | 9/2012 | Kajino et al. |
| 8,285,447 B2 | 10/2012 | Bennett et al. |
| 8,286,982 B2 | 10/2012 | Plantet et al. |
| 8,291,889 B2 | 10/2012 | Shafer et al. |
| 8,292,274 B2 | 10/2012 | Adoline et al. |
| 8,307,965 B2 | 11/2012 | Föster et al. |
| 8,308,124 B2 | 11/2012 | Hsu |
| 8,317,261 B2 | 11/2012 | Walsh et al. |
| 8,321,177 B2 | 11/2012 | Sack et al. |
| 8,322,497 B2 | 12/2012 | Marjoram et al. |
| 8,328,454 B2 | 12/2012 | McAndrews et al. |
| 8,336,683 B2 | 12/2012 | McAndrews et al. |
| 8,393,446 B2 | 3/2013 | Haugen |
| 8,413,773 B2 | 4/2013 | Anderfaas et al. |
| 8,423,244 B2 | 4/2013 | Proemm et al. |
| 8,430,770 B2 | 4/2013 | Dugan et al. |
| 8,458,080 B2 | 6/2013 | Shirai |
| 8,480,064 B2 | 7/2013 | Talavasek |
| 8,495,947 B2 | 7/2013 | Hata |
| 8,550,223 B2 | 10/2013 | Cox et al. |
| 8,550,551 B2 | 10/2013 | Shirai |
| 8,556,048 B2 | 10/2013 | Maeda et al. |
| 8,556,049 B2 | 10/2013 | Jee |
| 8,596,663 B2 | 12/2013 | Shirai et al. |
| 8,616,351 B2 | 12/2013 | Roessle et al. |
| 8,622,180 B2 | 1/2014 | Wootten et al. |
| 8,627,932 B2 | 1/2014 | Marking |
| 8,641,073 B2 | 2/2014 | Lee et al. |
| 8,651,251 B2 | 2/2014 | Preukschat et al. |
| 8,655,548 B2 | 2/2014 | Ichida et al. |
| 8,727,947 B2 | 5/2014 | Tagliabue |
| 8,744,699 B2 | 6/2014 | Yamaguchi et al. |
| 8,752,682 B2 | 6/2014 | Park et al. |
| 8,763,770 B2 | 7/2014 | Marking |
| 8,770,357 B2 | 7/2014 | Sims et al. |
| 8,781,680 B2 | 7/2014 | Ichida et al. |
| 8,781,690 B2 | 7/2014 | Hara et al. |
| 8,814,109 B2 | 8/2014 | Calendrille et al. |
| 8,833,786 B2 | 9/2014 | Camp et al. |
| 8,838,335 B2 | 9/2014 | Bass et al. |
| 8,845,496 B2 | 9/2014 | Arrasvuori et al. |

(56) References Cited

U.S. PATENT DOCUMENTS

| | | |
|---|---|---|
| 8,857,580 B2 | 10/2014 | Marking |
| 8,868,253 B2 | 10/2014 | Hashimoto et al. |
| 8,888,115 B2 | 11/2014 | Chubbuck et al. |
| 8,935,036 B1 | 1/2015 | Christensen et al. |
| 8,936,139 B2 | 1/2015 | Franklin et al. |
| 8,950,771 B2 | 2/2015 | Felsl et al. |
| 8,955,653 B2 | 2/2015 | Marking |
| 8,967,343 B2 | 3/2015 | Battlogg et al. |
| 8,985,594 B2 | 3/2015 | Yabumoto |
| 8,991,571 B2 | 3/2015 | Murakami |
| 9,033,122 B2 | 5/2015 | Ericksen et al. |
| 9,038,791 B2 | 5/2015 | Marking |
| 9,047,778 B1 | 6/2015 | Cazanas et al. |
| 9,057,416 B2 | 6/2015 | Talavasek |
| 9,073,592 B2 | 7/2015 | Hsu |
| 9,103,400 B2 | 8/2015 | Becker |
| 9,108,098 B2 | 8/2015 | Galasso et al. |
| 9,120,362 B2 | 9/2015 | Marking |
| 9,126,647 B2 | 9/2015 | Kuo |
| 9,140,325 B2 | 9/2015 | Cox et al. |
| 9,157,523 B2 | 10/2015 | Miki et al. |
| 9,186,949 B2 | 11/2015 | Galasso et al. |
| 9,194,456 B2 | 11/2015 | Laird et al. |
| 9,199,690 B2 | 12/2015 | Watarai |
| 9,229,712 B2 | 1/2016 | Takamoto et al. |
| 9,239,090 B2 | 1/2016 | Marking |
| 9,278,598 B2 | 3/2016 | Galasso et al. |
| 9,303,712 B2 | 4/2016 | Cox |
| 9,353,818 B2 | 5/2016 | Marking |
| 9,366,307 B2 | 6/2016 | Marking |
| 9,415,659 B2 | 8/2016 | Kikuchi et al. |
| 9,422,018 B2 | 8/2016 | Pelot et al. |
| 9,422,025 B2 | 8/2016 | Pezzi et al. |
| 9,452,654 B2 | 9/2016 | Ericksen et al. |
| 9,523,406 B2 | 12/2016 | Galasso et al. |
| 9,528,565 B2 | 12/2016 | Marking |
| 9,550,405 B2 | 1/2017 | Marking et al. |
| 9,556,925 B2 | 1/2017 | Marking |
| 9,616,728 B2 | 4/2017 | Marking |
| 9,650,094 B2 | 5/2017 | Laird et al. |
| 9,663,181 B2 | 5/2017 | Ericksen et al. |
| 9,682,604 B2 | 6/2017 | Cox et al. |
| 9,765,842 B2 * | 9/2017 | Noguchi .................. F16F 9/48 |
| 9,784,333 B2 | 10/2017 | Marking |
| 9,810,282 B2 | 11/2017 | Roessle et al. |
| 9,975,598 B2 | 5/2018 | Bender et al. |
| 10,012,282 B2 * | 7/2018 | Kimura .................. F16F 9/46 |
| 10,036,443 B2 | 7/2018 | Galasso et al. |
| 10,040,328 B2 | 8/2018 | Marking |
| 10,040,329 B2 | 8/2018 | Ericksen et al. |
| 10,047,817 B2 | 8/2018 | Ericksen et al. |
| 10,054,185 B2 | 8/2018 | Cox |
| 10,072,724 B2 | 9/2018 | Haugen et al. |
| 10,086,670 B2 | 10/2018 | Galasso et al. |
| 10,089,868 B1 | 10/2018 | Hayward |
| 10,094,443 B2 | 10/2018 | Marking |
| 10,160,511 B2 | 12/2018 | Ericksen et al. |
| 10,330,171 B2 | 6/2019 | Cox et al. |
| 10,336,148 B2 | 7/2019 | Ericksen et al. |
| 10,336,149 B2 | 7/2019 | Ericksen et al. |
| 10,406,883 B2 | 9/2019 | Marking |
| 10,415,662 B2 | 9/2019 | Marking |
| 10,443,671 B2 | 10/2019 | Marking |
| 10,473,179 B2 | 11/2019 | Ripa |
| 10,670,106 B2 | 6/2020 | Ericksen et al. |
| 10,677,309 B2 | 6/2020 | Ericksen et al. |
| 10,697,514 B2 | 6/2020 | Marking |
| 10,718,397 B2 | 7/2020 | Marking |
| 10,723,409 B2 | 7/2020 | Ericksen et al. |
| 10,737,546 B2 | 8/2020 | Tong |
| 11,279,198 B2 | 3/2022 | Marking |
| 11,299,233 B2 | 4/2022 | Ericksen et al. |
| 11,472,252 B2 | 10/2022 | Tong |
| 11,549,565 B2 | 1/2023 | Ericksen et al. |
| 11,708,878 B2 | 7/2023 | Marking |
| 11,866,120 B2 | 1/2024 | Ericksen et al. |
| 2001/0017334 A1 | 8/2001 | Vincent |
| 2001/0022621 A1 | 9/2001 | Squibbs |
| 2001/0030408 A1 | 10/2001 | Miyoshi et al. |
| 2001/0042663 A1 | 11/2001 | Marking et al. |
| 2001/0055373 A1 | 12/2001 | Yamashita |
| 2002/0000352 A1 | 1/2002 | Matsumoto et al. |
| 2002/0032508 A1 | 3/2002 | Uchino et al. |
| 2002/0045987 A1 | 4/2002 | Ohata et al. |
| 2002/0050112 A1 | 5/2002 | Koch et al. |
| 2002/0050518 A1 | 5/2002 | Roustaei |
| 2002/0053493 A1 | 5/2002 | Sintorn et al. |
| 2002/0055422 A1 | 5/2002 | Airmet et al. |
| 2002/0063469 A1 | 5/2002 | Nishio |
| 2002/0089107 A1 | 7/2002 | Koh |
| 2002/0095979 A1 | 7/2002 | Shirato et al. |
| 2002/0113347 A1 | 8/2002 | Robbins et al. |
| 2002/0121416 A1 | 9/2002 | Katayama et al. |
| 2002/0130000 A1 | 9/2002 | Lisenker et al. |
| 2002/0130003 A1 | 9/2002 | Lisenker et al. |
| 2002/0185581 A1 | 12/2002 | Trask et al. |
| 2002/0187867 A1 | 12/2002 | Ichida et al. |
| 2003/0001346 A1 | 1/2003 | Hamilton et al. |
| 2003/0001358 A1 | 1/2003 | Becker et al. |
| 2003/0034697 A1 | 2/2003 | Goldner et al. |
| 2003/0040348 A1 | 2/2003 | Martens et al. |
| 2003/0051954 A1 | 3/2003 | Sendrea |
| 2003/0054327 A1 | 3/2003 | Evensen et al. |
| 2003/0065430 A1 | 4/2003 | Lu et al. |
| 2003/0075403 A1 | 4/2003 | Dernebo |
| 2003/0103651 A1 | 6/2003 | Novak |
| 2003/0128275 A1 | 7/2003 | Maguire |
| 2003/0160369 A1 | 8/2003 | LaPlante et al. |
| 2003/0216845 A1 | 11/2003 | Williston |
| 2004/0004659 A1 | 1/2004 | Foote et al. |
| 2004/0017455 A1 | 1/2004 | Kremers et al. |
| 2004/0021754 A1 | 2/2004 | Kremers et al. |
| 2004/0075350 A1 | 4/2004 | Kuhnel |
| 2004/0091111 A1 | 5/2004 | Levy et al. |
| 2004/0099312 A1 | 5/2004 | Boyer et al. |
| 2004/0103146 A1 | 5/2004 | Park |
| 2004/0172178 A1 | 9/2004 | Takeda et al. |
| 2004/0208687 A1 | 10/2004 | Sicz et al. |
| 2004/0220708 A1 | 11/2004 | Owen et al. |
| 2004/0220712 A1 | 11/2004 | Takeda et al. |
| 2004/0222056 A1 | 11/2004 | Fox |
| 2004/0256778 A1 | 12/2004 | Verriet |
| 2005/0055156 A1 | 3/2005 | Maltagliati et al. |
| 2005/0056507 A1 | 3/2005 | De Molina et al. |
| 2005/0077131 A1 | 4/2005 | Russell |
| 2005/0098401 A1 * | 5/2005 | Hamilton .................. F16F 9/466 188/378 |
| 2005/0104320 A1 | 5/2005 | Wesling et al. |
| 2005/0107216 A1 | 5/2005 | Lee et al. |
| 2005/0110229 A1 | 5/2005 | Kimura et al. |
| 2005/0121269 A1 | 6/2005 | Namuduri |
| 2005/0173849 A1 | 8/2005 | Vandewal |
| 2005/0199455 A1 | 9/2005 | Browne et al. |
| 2005/0216186 A1 | 9/2005 | Dorfman et al. |
| 2005/0227798 A1 | 10/2005 | Ichida et al. |
| 2005/0239601 A1 | 10/2005 | Thomas |
| 2005/0288154 A1 | 12/2005 | Lee et al. |
| 2006/0040793 A1 | 2/2006 | Martens et al. |
| 2006/0064223 A1 | 3/2006 | Voss |
| 2006/0065496 A1 | 3/2006 | Fox |
| 2006/0066074 A1 | 3/2006 | Turner et al. |
| 2006/0076757 A1 | 4/2006 | Bromley |
| 2006/0081431 A1 | 4/2006 | Breese et al. |
| 2006/0096817 A1 | 5/2006 | Norgaard et al. |
| 2006/0113834 A1 | 6/2006 | Hanawa |
| 2006/0120080 A1 | 6/2006 | Sipinski et al. |
| 2006/0124414 A1 | 6/2006 | Hanawa |
| 2006/0136173 A1 | 6/2006 | Case et al. |
| 2006/0137934 A1 | 6/2006 | Kurth |
| 2006/0163551 A1 | 7/2006 | Coenen et al. |
| 2006/0163787 A1 | 7/2006 | Munster et al. |
| 2006/0175792 A1 | 8/2006 | Sicz et al. |
| 2006/0176216 A1 | 8/2006 | Hipskind |
| 2006/0185951 A1 | 8/2006 | Tanaka |

(56) References Cited

U.S. PATENT DOCUMENTS

| | | |
|---|---|---|
| 2006/0213082 A1 | 9/2006 | Meschan |
| 2006/0219503 A1 | 10/2006 | Kim |
| 2006/0225976 A1 | 10/2006 | Nakadate |
| 2006/0225979 A1 | 10/2006 | Quinn et al. |
| 2006/0231359 A1 | 10/2006 | Matsunaga et al. |
| 2006/0237272 A1 | 10/2006 | Huang |
| 2006/0253210 A1 | 11/2006 | Rosenberg |
| 2006/0254365 A1 | 11/2006 | Hamel |
| 2006/0265144 A1 | 11/2006 | Frolik |
| 2006/0289258 A1 | 12/2006 | Fox |
| 2007/0006489 A1 | 1/2007 | Case et al. |
| 2007/0007743 A1 | 1/2007 | Becker et al. |
| 2007/0008096 A1 | 1/2007 | Tracy |
| 2007/0021886 A1 | 1/2007 | Miyajima |
| 2007/0032981 A1 | 2/2007 | Merkel et al. |
| 2007/0034464 A1 | 2/2007 | Barefoot |
| 2007/0039790 A1 | 2/2007 | Timoney et al. |
| 2007/0051573 A1 | 3/2007 | Norgaard et al. |
| 2007/0070069 A1 | 3/2007 | Samarasekera et al. |
| 2007/0080515 A1 | 4/2007 | McAndrews et al. |
| 2007/0088475 A1 | 4/2007 | Nordgren et al. |
| 2007/0090518 A1 | 4/2007 | Sauciuc et al. |
| 2007/0119669 A1 | 5/2007 | Anderfaas et al. |
| 2007/0199401 A1 | 8/2007 | Kawakami et al. |
| 2007/0213126 A1 | 9/2007 | Deutsch et al. |
| 2007/0239479 A1 | 10/2007 | Arrasvuori et al. |
| 2007/0260372 A1 | 11/2007 | Langer |
| 2007/0272458 A1 | 11/2007 | Taniguchi et al. |
| 2008/0006494 A1 | 1/2008 | Vandewal |
| 2008/0009992 A1 | 1/2008 | Izawa et al. |
| 2008/0015089 A1 | 1/2008 | Hurwitz et al. |
| 2008/0018065 A1 | 1/2008 | Hirao et al. |
| 2008/0029730 A1 | 2/2008 | Kamo et al. |
| 2008/0041677 A1 | 2/2008 | Namuduri |
| 2008/0059025 A1 | 3/2008 | Furuichi et al. |
| 2008/0067019 A1 | 3/2008 | Jensen et al. |
| 2008/0093820 A1 | 4/2008 | McAndrews |
| 2008/0096726 A1 | 4/2008 | Riley et al. |
| 2008/0099968 A1 | 5/2008 | Schroeder |
| 2008/0109158 A1 | 5/2008 | Huhtala et al. |
| 2008/0116622 A1 | 5/2008 | Fox |
| 2008/0119330 A1 | 5/2008 | Chiang et al. |
| 2008/0162009 A1 | 7/2008 | Miki et al. |
| 2008/0163718 A1 | 7/2008 | Chiang |
| 2008/0185244 A1 | 8/2008 | Maeda et al. |
| 2008/0200310 A1 | 8/2008 | Tagliabue |
| 2008/0250844 A1* | 10/2008 | Gartner ............... F16F 9/3264 73/11.07 |
| 2008/0254944 A1 | 10/2008 | Muri et al. |
| 2008/0303320 A1 | 12/2008 | Schranz et al. |
| 2008/0312799 A1 | 12/2008 | Miglioranza |
| 2008/0314706 A1 | 12/2008 | Lun et al. |
| 2009/0001684 A1 | 1/2009 | McAndrews et al. |
| 2009/0020382 A1 | 1/2009 | Van Weelden et al. |
| 2009/0038897 A1 | 2/2009 | Murakami |
| 2009/0048070 A1 | 2/2009 | Vincent et al. |
| 2009/0069972 A1 | 3/2009 | Templeton et al. |
| 2009/0070037 A1 | 3/2009 | Templeton et al. |
| 2009/0071772 A1 | 3/2009 | Cho et al. |
| 2009/0071773 A1 | 3/2009 | Lun |
| 2009/0098981 A1 | 4/2009 | Del Giorno |
| 2009/0118100 A1 | 5/2009 | Oliver et al. |
| 2009/0121398 A1 | 5/2009 | Inoue |
| 2009/0131224 A1 | 5/2009 | Yuen |
| 2009/0138157 A1 | 5/2009 | Hagglund et al. |
| 2009/0140501 A1 | 6/2009 | Taylor et al. |
| 2009/0171532 A1 | 7/2009 | Ryan et al. |
| 2009/0192673 A1 | 7/2009 | Song et al. |
| 2009/0200126 A1 | 8/2009 | Kondo et al. |
| 2009/0236807 A1 | 9/2009 | Wootten et al. |
| 2009/0258710 A1 | 10/2009 | Quatrochi et al. |
| 2009/0261542 A1 | 10/2009 | Mcintyre |
| 2009/0277736 A1 | 11/2009 | McAndrews et al. |
| 2009/0288924 A1 | 11/2009 | Murray et al. |
| 2009/0294231 A1 | 12/2009 | Carlson et al. |
| 2009/0302558 A1 | 12/2009 | Shirai |
| 2009/0314592 A1 | 12/2009 | Nygren |
| 2009/0324327 A1 | 12/2009 | McAndrews et al. |
| 2010/0004097 A1 | 1/2010 | D'Eredita |
| 2010/0010709 A1 | 1/2010 | Song |
| 2010/0025946 A1 | 2/2010 | Inoue et al. |
| 2010/0032254 A1 | 2/2010 | Anderfaas et al. |
| 2010/0044975 A1 | 2/2010 | Yablon et al. |
| 2010/0059964 A1 | 3/2010 | Morris |
| 2010/0066051 A1 | 3/2010 | Haugen |
| 2010/0109277 A1 | 5/2010 | Furrer |
| 2010/0133764 A1 | 6/2010 | Greaves |
| 2010/0139442 A1 | 6/2010 | Tsumiyama |
| 2010/0147640 A1 | 6/2010 | Jones et al. |
| 2010/0160014 A1 | 6/2010 | Galasso et al. |
| 2010/0170760 A1 | 7/2010 | Marking |
| 2010/0186836 A1 | 7/2010 | Yoshihiro et al. |
| 2010/0198453 A1 | 8/2010 | Dorogusker et al. |
| 2010/0207351 A1 | 8/2010 | Klieber et al. |
| 2010/0224454 A1 | 9/2010 | Chen et al. |
| 2010/0244340 A1 | 9/2010 | Wootten et al. |
| 2010/0252972 A1 | 10/2010 | Cox et al. |
| 2010/0276238 A1 | 11/2010 | Crasset |
| 2010/0276906 A1 | 11/2010 | Galasso et al. |
| 2010/0308628 A1 | 12/2010 | Hsu et al. |
| 2010/0314917 A1 | 12/2010 | Hsieh et al. |
| 2010/0324781 A1 | 12/2010 | Gagliano |
| 2010/0326780 A1 | 12/2010 | Murakami |
| 2010/0327542 A1 | 12/2010 | Hara et al. |
| 2011/0022266 A1 | 1/2011 | Ippolito et al. |
| 2011/0035105 A1 | 2/2011 | Jolly |
| 2011/0067965 A1 | 3/2011 | McAndrews |
| 2011/0086686 A1 | 4/2011 | Avent et al. |
| 2011/0095507 A1 | 4/2011 | Plantet et al. |
| 2011/0097139 A1 | 4/2011 | Hsu et al. |
| 2011/0109060 A1 | 5/2011 | Earle et al. |
| 2011/0127706 A1 | 6/2011 | Sims et al. |
| 2011/0174582 A1 | 7/2011 | Wootten et al. |
| 2011/0202236 A1 | 8/2011 | Galasso et al. |
| 2011/0204201 A1 | 8/2011 | Kodama et al. |
| 2011/0214956 A1 | 9/2011 | Marking |
| 2011/0257848 A1 | 10/2011 | Shirai |
| 2011/0284333 A1 | 11/2011 | Krog et al. |
| 2011/0315494 A1 | 12/2011 | Marking |
| 2012/0006949 A1 | 1/2012 | Laird et al. |
| 2012/0007327 A1 | 1/2012 | Talavasek |
| 2012/0018263 A1 | 1/2012 | Marking |
| 2012/0018264 A1 | 1/2012 | King |
| 2012/0048665 A1 | 3/2012 | Marking |
| 2012/0074660 A1 | 3/2012 | Thomas |
| 2012/0080279 A1 | 4/2012 | Galasso et al. |
| 2012/0136537 A1 | 5/2012 | Galasso et al. |
| 2012/0181126 A1 | 7/2012 | De Kock |
| 2012/0221228 A1 | 8/2012 | Noumura et al. |
| 2012/0222927 A1 | 9/2012 | Marking |
| 2012/0228906 A1 | 9/2012 | McAndrews et al. |
| 2012/0253599 A1 | 10/2012 | Shirai |
| 2012/0253600 A1 | 10/2012 | Ichida et al. |
| 2012/0274043 A1 | 11/2012 | Lee et al. |
| 2012/0305350 A1 | 12/2012 | Ericksen et al. |
| 2012/0312648 A1 | 12/2012 | Yu et al. |
| 2013/0001030 A1 | 1/2013 | Goldasz et al. |
| 2013/0037361 A1 | 2/2013 | Park et al. |
| 2013/0090195 A1 | 4/2013 | Yamaguchi et al. |
| 2013/0119634 A1 | 5/2013 | Camp et al. |
| 2013/0144489 A1 | 6/2013 | Galasso et al. |
| 2013/0168195 A1 | 7/2013 | Park et al. |
| 2013/0220110 A1 | 8/2013 | Zhan et al. |
| 2013/0221713 A1 | 8/2013 | Pelot et al. |
| 2013/0292218 A1 | 11/2013 | Ericksen et al. |
| 2013/0333993 A1 | 12/2013 | Yu |
| 2014/0008160 A1 | 1/2014 | Marking et al. |
| 2014/0027219 A1 | 1/2014 | Marking et al. |
| 2014/0048365 A1 | 2/2014 | Kim |
| 2014/0061419 A1 | 3/2014 | Wehage et al. |
| 2014/0081522 A1 | 3/2014 | Fry |
| 2014/0124313 A1 | 5/2014 | Ericksen et al. |
| 2014/0316652 A1 | 10/2014 | Ericksen et al. |
| 2015/0073656 A1 | 3/2015 | Takamoto et al. |

(56) References Cited

U.S. PATENT DOCUMENTS

| | | | |
|---|---|---|---|
| 2015/0081171 A1 | 3/2015 | Ericksen et al. | |
| 2015/0141056 A1 | 5/2015 | Fefilatyev et al. | |
| 2015/0175236 A1 | 6/2015 | Walthert et al. | |
| 2015/0179062 A1 | 6/2015 | Ralston et al. | |
| 2015/0191069 A1 | 7/2015 | Zuleger et al. | |
| 2015/0197308 A1 | 7/2015 | Butora et al. | |
| 2015/0217829 A1 | 8/2015 | Ericksen et al. | |
| 2015/0233442 A1* | 8/2015 | Noguchi | F16F 9/06 188/284 |
| 2015/0276000 A1* | 10/2015 | Kimura | F16F 9/3257 188/315 |
| 2015/0291248 A1 | 10/2015 | Fukao et al. | |
| 2016/0003320 A1 | 1/2016 | Kamakura et al. | |
| 2016/0025178 A1 | 1/2016 | Kamakura et al. | |
| 2016/0031506 A1 | 2/2016 | Lloyd et al. | |
| 2016/0076617 A1* | 3/2016 | Marking | F16F 9/46 188/314 |
| 2016/0153515 A1 | 6/2016 | Ebersbach et al. | |
| 2016/0153516 A1 | 6/2016 | Marking | |
| 2016/0185178 A1 | 6/2016 | Galasso et al. | |
| 2016/0200163 A1* | 7/2016 | Tsukahara | B60G 13/08 188/313 |
| 2016/0200164 A1 | 7/2016 | Tabata et al. | |
| 2016/0265615 A1 | 9/2016 | Marking | |
| 2016/0290431 A1 | 10/2016 | Marking | |
| 2016/0319899 A1 | 11/2016 | Franklin et al. | |
| 2016/0355226 A1 | 12/2016 | Pelot et al. | |
| 2016/0364989 A1 | 12/2016 | Speasl et al. | |
| 2017/0008363 A1 | 1/2017 | Ericksen et al. | |
| 2017/0136843 A1 | 5/2017 | Marking | |
| 2017/0184174 A1 | 6/2017 | Marking | |
| 2017/0247072 A1 | 8/2017 | Laird et al. | |
| 2017/0259876 A1 | 9/2017 | Ericksen et al. | |
| 2017/0268595 A1* | 9/2017 | Inagaki | F16F 9/34 |
| 2017/0282669 A1 | 10/2017 | Cox et al. | |
| 2017/0291466 A1 | 10/2017 | Tong | |
| 2018/0010666 A1* | 1/2018 | Marking | B60G 17/08 |
| 2018/0031071 A1 | 2/2018 | Marking | |
| 2018/0150764 A1 | 5/2018 | Stenneth | |
| 2018/0156300 A1* | 6/2018 | Sakai | F16F 9/50 |
| 2018/0174446 A1 | 6/2018 | Wang | |
| 2018/0208011 A1* | 7/2018 | Wigg | B60G 17/0152 |
| 2018/0222541 A1 | 8/2018 | Madau et al. | |
| 2018/0326805 A1* | 11/2018 | Marking | F16F 9/185 |
| 2018/0326808 A1 | 11/2018 | Ericksen et al. | |
| 2018/0328442 A1 | 11/2018 | Galasso et al. | |
| 2018/0328446 A1 | 11/2018 | Ericksen et al. | |
| 2018/0334007 A1 | 11/2018 | Ericksen et al. | |
| 2018/0334008 A1 | 11/2018 | Ericksen et al. | |
| 2018/0335102 A1 | 11/2018 | Haugen | |
| 2018/0339565 A1 | 11/2018 | Ericksen et al. | |
| 2018/0339566 A1 | 11/2018 | Ericksen et al. | |
| 2018/0339567 A1 | 11/2018 | Ericksen et al. | |
| 2018/0355946 A1 | 12/2018 | Ericksen et al. | |
| 2019/0030975 A1 | 1/2019 | Galasso et al. | |
| 2019/0032745 A1 | 1/2019 | Marking | |
| 2019/0154100 A1* | 5/2019 | Coaplen | B60G 15/062 |
| 2019/0184782 A1 | 6/2019 | Shaw et al. | |
| 2019/0203798 A1 | 7/2019 | Cox et al. | |
| 2019/0226545 A1* | 7/2019 | Schmidt | F16F 9/067 |
| 2020/0292025 A1 | 9/2020 | Ericksen et al. | |
| 2020/0354013 A1 | 11/2020 | Ericksen et al. | |
| 2022/0242186 A1 | 8/2022 | Tong | |
| 2023/0002002 A1 | 1/2023 | Ericksen et al. | |

FOREIGN PATENT DOCUMENTS

| | | |
|---|---|---|
| DE | 3241901 A1 | 5/1984 |
| DE | 3613386 * | 10/1986 |
| DE | 3532292 A1 | 3/1987 |
| DE | 3536655 A1 | 4/1987 |
| DE | 3709447 A1 | 10/1988 |
| DE | 3711442 A1 | 10/1988 |
| DE | 3738048 A1 | 5/1989 |
| DE | 0403803 * | 12/1990 |
| DE | 3924166 C1 | 2/1991 |
| DE | 4022099 C1 | 12/1991 |
| DE | 4029090 A1 | 3/1992 |
| DE | 4406918 A1 | 9/1994 |
| DE | 202004005229 U1 | 8/2004 |
| DE | 10326675 A1 | 12/2004 |
| DE | 102005025811 A1 | 12/2006 |
| DE | 102007063365 A1 | 7/2009 |
| DE | 202008015968 U1 | 4/2010 |
| DE | 202010012738 U1 | 12/2010 |
| EP | 0207409 | 1/1987 |
| EP | 207409 A2 | 1/1987 |
| EP | 304801 A2 | 3/1989 |
| EP | 552568 A1 | 7/1993 |
| EP | 0735280 A2 | 10/1996 |
| EP | 1050696 A2 | 11/2000 |
| EP | 1138530 A2 | 10/2001 |
| EP | 1188661 A2 | 3/2002 |
| EP | 1241087 A1 | 9/2002 |
| EP | 1355209 A1 | 10/2003 |
| EP | 1394439 A1 | 3/2004 |
| EP | 1449688 A2 | 8/2004 |
| EP | 1623856 A2 | 2/2006 |
| EP | 1757473 A2 | 2/2007 |
| EP | 2103512 A2 | 9/2009 |
| EP | 2116739 A2 | 11/2009 |
| EP | 2248691 A1 | 11/2010 |
| EP | 2357098 A2 | 8/2011 |
| EP | 2410203 A2 | 1/2012 |
| EP | 2479095 A2 | 7/2012 |
| EP | 2495472 A2 | 9/2012 |
| EP | 2357098 B1 | 10/2014 |
| EP | 2848582 A1 | 3/2015 |
| EP | 3786049 A1 | 3/2021 |
| EP | 3786049 B1 | 5/2023 |
| FR | 1343760 A | 11/1963 |
| FR | 2432424 A1 | 2/1980 |
| FR | 2449236 A1 | 9/1980 |
| FR | 2529002 A2 | 12/1983 |
| FR | 2617928 A1 | 1/1989 |
| FR | 2952031 A1 | 5/2011 |
| GB | 806307 A | 12/1958 |
| GB | 1185074 A | 3/1970 |
| GB | 2104183 A | 3/1983 |
| GB | 2159234 A | 11/1985 |
| GB | 2159604 A | 12/1985 |
| GB | 2180320 A | 3/1987 |
| GB | 2190461 A | 11/1987 |
| GB | 2282864 A | 4/1995 |
| GB | 2289111 A | 11/1995 |
| JP | 57173632 A | 10/1982 |
| JP | 57173632 U | 11/1982 |
| JP | 57182506 A | 11/1982 |
| JP | S58172142 A | 10/1983 |
| JP | 01106721 A | 4/1989 |
| JP | H0193637 A | 4/1989 |
| JP | H02168038 A | 6/1990 |
| JP | H03113139 A | 5/1991 |
| JP | 04203540 A | 7/1992 |
| JP | 05149364 A | 6/1993 |
| JP | H05319054 A | 12/1993 |
| JP | 06101735 A | 4/1994 |
| JP | 06185562 A | 7/1994 |
| JP | H084818 A | 1/1996 |
| JP | H1073141 A | 3/1998 |
| JP | 2005119548 A | 5/2005 |
| JP | 2007302211 A | 11/2007 |
| JP | 2008238921 A | 10/2008 |
| KR | 19980043226 U | 9/1998 |
| KR | 20070076226 A | 7/2007 |
| KR | 20100041679 * | 4/2010 |
| RU | 2469224 C1 | 12/2012 |
| WO | 9840231 A2 | 9/1998 |
| WO | 99/06231 | 2/1999 |
| WO | 0027658 A1 | 5/2000 |
| WO | 03070546 A1 | 8/2003 |
| WO | 2007017739 A2 | 2/2007 |
| WO | 2007117884 A2 | 10/2007 |

(56) References Cited

FOREIGN PATENT DOCUMENTS

| WO | 2008086605 A1 | 7/2008 |
|---|---|---|
| WO | 2008114445 A1 | 9/2008 |
| WO | 2013066159 A1 | 5/2013 |

OTHER PUBLICATIONS

Machine translation DE3613386; Oct. 1986.*
Machine Translation, KR20100041679; Apr. 2010.*
Fachkunde Fahrradtechnik 4 Auflage, Gressmann_Inhaltv und S, 2011, 206-207.
Statement of Grounds of Appeal, EP App. No. 11153607.4, May 28, 2018, 88 Pages.
European Search Report, European Patent Application No. 14189773.6, dated May 4, 2015, 4 Pages.
Grounds of Appeal, EP App. No. 11153607.4, Jun. 1, 2018, 28 Pages.
EP Search Report for European Application No. 15163428.4, dated Jul. 3, 2017, 7 Pages.
"Communication Re Oral Proceedings for European Application No. 10161906, dated Feb. 15, 2013 (dated Feb. 15, 2013)".
"European Patent Office Final Decision dated Mar. 21, 2013", European Patent Application No. 10161906.2.
"European Search Report for European Application No. 09159949, 2 pages, dated Sep. 11, 2017 (dated Sep. 11, 2017)".
"European Search Report for European Application No. 09177128, 4 pages, dated Aug. 25, 2010 (dated Aug. 25, 2010)".
"European Search Report for European Application No. 10161906, 3 pages, dated Sep. 15, 2010 (dated Sep. 15, 2010)".
"European Search Report for European Application No. 10187320, 12 pages, dated Sep. 25, 2017 (dated Sep. 25, 2017)".
"European Search Report for European Application No. 11153607, 3 pages, dated Aug. 10, 2012 (dated Aug. 10, 2012))".
"European Search Report for European Application No. 11172553, 2 pages, dated Sep. 25, 2017 (dated Sep. 25, 2017)".
"European Search Report for European Application No. 11172612, 2 pages, dated Oct. 6, 2011 (dated Oct. 6, 2011))".
"European Search Report for European Application No. 11175126, 2 pages,dated Sep. 25, 2017 (dated Sep. 25, 2017)".
"European Search Report for European Application No. 11275170, 2 pages, dated Jan. 10, 2018 (dated Jan. 10, 2018)".
"European Search Report for European Application No. 12170370, 2 pages, dated Nov. 15, 2017 (dated Nov. 15, 2017)".
"European Search Report for European Application No. 12184150, 10 pages, dated Dec. 12, 2017 (dated Dec. 12, 2017)".
"European Search Report for European Application No. 13158034, 4 pages, dated Jun. 28, 2013 (dated Jun. 13, 2013))".
"European Search Report for European Application No. 13174817.0, 13 pages, dated Jan. 8, 2018 (dated Jan. 8, 2018)".
"European Search Report for European Application No. 13189574, 2 pages, dated Feb. 19, 2014 (dated Feb. 19, 2014)".
"European Search Report for European Application No. 15167426, 4 pages, dated Sep. 18, 2015 (dated Sep. 18, 2015))".
"European Search Report for European Application No. 16167306, 2 pages, dated Mar. 23, 2017 (dated Mar. 23, 2017)".
"European Search Report for European Application No. 17154191, 2 pages, dated Jun. 28, 2017 (dated Jun. 28, 2017)".
"European Search Report for European Application No. 17188022, 9 pages, dated Feb. 1, 2018 (dated Feb. 1, 2018))".
"European Search Report and Written Opinion, European Patent Application No. 13165362.8", dated Sep. 24, 2014, 6 Pages.
"Office Action for European Application No. 13158034.2, 5 pages, dated May 22, 2014".
"The Lee Company Technical Hydraulic Handbook", 1996, 1-696.
Healey, "The Tyre as Part of the Suspension System", The Institution of Automobile Engineers, Nov. 1924, 26-128.
Kasprzak, "Understanding Your Dampers: A guide from Jim Kasprzak", http://www.kaztechnologies.com/downloads/kaz-tech-tips/ Accessed: Oct. 24, 2018, 25 pages.
Litchfield, "Pneumatic Tires", Transactions (Society of Automobile Engineers), vol. 8, Part II, 1913, 208-223.
Nilsson, "Opposition Letter Against EP-2357098", Oct. 13, 2017, 7.
Puhn, "How To Make Your Car Handle", HPBooks, 1981, 7 Pages.
Shiozaki, et al., "SP-861-Vehicle Dynamics and Electronic Controlled Suspensions SAE Technical Paper Series No. 910661", International Congress and Exposition, Detroit, Mich., Feb. 25-Mar. 1, 1991.
Smith, ""The Bump Stop" in Engineer to win—Chapter 13: Springs and Shock Absorbers", MBI Publishing Company and Motorbooks, USA XP055430818, ISBN: 978-0-87938-186-8, Dec. 31, 1984, 207.
Thum, "Oppostion Letter Against EP2357098", Oct. 16, 2018, 39.
Waechter, et al., "A Multibody Model for the Simulation of Bicycle Suspension Systems", Vehicle System Dynamics, vol. 37, No. 1, 2002, 3-28.
European Search Report for European Application No. 19206334.5, 6 pages, dated May 12, 2020 (dated May 12, 2020).
European Search Report for European Application No. 19212356.0, 8 pages, dated May 7, 2020 (dated May 7, 2020).
European Search Report for European Application No. 19157767, dated Oct. 16, 2019, 9 Pages.
Thum, "Opposition Letter Against EP2357098", Dec. 17, 2019, 25 Pages.
European Search Report for European Application No. 20187747, dated Nov. 18, 2020, 11 Pages.
1 European Search Report for European Application No. 19193903.2, 6 pages, dated Oct. 19, 2021 (dated Oct. 19, 2021).
Haller, E, EPO machine translation of CN 101468587 (A) Device with a suspension system and method for setting a suspension system, published on Jul. 1, 2009.
Kensuke, Suspension Control Device, machine translation of JPH05319054 (A), Dec. 3, 1993 (Year: 1993).
European Extended Search Report for European Application No. 23166846.8, 24 Pages, Mailed Jul. 25, 2024.

* cited by examiner

ACTIVE VALVE FOR AN INTERNAL BYPASS

This application is a continuation-in-part application of and claims priority to and benefit of co-pending U.S. patent application Ser. No. 16/044,380, filed on Jul. 24, 2018 entitled, "ADJUSTABLE INTERNAL BYPASS" by John Marking, assigned to the assignee of the present application, and incorporated herein, in its entirety, by reference.

The application with Ser. No. 16/044,380 is a continuation application of and claims priority to and benefit of U.S. patent application Ser. No. 15/387,236, filed on Sep. 16, 2014, now U.S. Issued U.S. Pat. No. 10,040,328, entitled, "ADJUSTABLE INTERNAL BYPASS" by John Marking, assigned to the assignee of the present application, and incorporated herein, in its entirety, by reference.

The application with Ser. No. 15/387,236 is a continuation application of and claims priority to and benefit of U.S. patent application Ser. No. 14/487,529, filed on Sep. 16, 2014, now U.S. Issued U.S. Pat. No. 9,528,565, entitled, "ADJUSTABLE INTERNAL BYPASS" by John Marking, assigned to the assignee of the present application, and incorporated herein, in its entirety, by reference.

This application is a continuation-in-part application of and claims the benefit of co-pending U.S. patent application Ser. No. 16/042,563, filed on Jul. 23, 2018, entitled "METHOD AND APPARATUS FOR AN ADJUSTABLE DAMPER" by Ericksen et al., assigned to the assignee of the present application, and is hereby incorporated by reference in its entirety herein.

The application with Ser. No. 16/042,563 is a continuation application of and claims the benefit of U.S. patent application Ser. No. 15/275,078, now Issued U.S. Pat. No. 10,040,329, filed on Sep. 23, 2016, entitled "METHOD AND APPARATUS FOR AN ADJUSTABLE DAMPER" by Ericksen et al., assigned to the assignee of the present application, and is hereby incorporated by reference in its entirety herein.

The application with Ser. No. 15/275,078 is a divisional application of and claims the benefit of U.S. patent application Ser. No. 14/466,831, now Issued U.S. Pat. No. 9,452,654, filed on Aug. 22, 2014, entitled "METHOD AND APPARATUS FOR AN ADJUSTABLE DAMPER" by Ericksen et al., assigned to the assignee of the present application, and is hereby incorporated by reference in its entirety herein.

The application with Ser. No. 14/466,831 is a continuation-in-part application of and claims the benefit of U.S. patent application Ser. No. 14/251,446, filed on Apr. 11, 2014, now Issued U.S. Pat. No. 10,047,817, entitled "METHOD AND APPARATUS FOR ADJUSTABLE DAMPER" by Ericksen et al., assigned to the assignee of the present application, and is hereby incorporated by reference in its entirety herein.

The U.S. patent application Ser. No. 14/251,446 is a continuation-in-part application of and claims the benefit of U.S. patent application Ser. No. 13/934,067, filed on Jul. 2, 2013, now Issued U.S. Pat. No. 10,060,499, entitled "METHOD AND APPARATUS FOR ADJUSTABLE DAMPER" by Ericksen et al., assigned to the assignee of the present application, and is hereby incorporated by reference in its entirety herein.

The application with Ser. No. 13/934,067 is a continuation-in-part application of and claims the benefit of U.S. patent application Ser. No. 13/843,704, now Issued U.S. Pat. No. 9,033,122, filed on Mar. 15, 2013, entitled "METHOD AND APPARATUS FOR ADJUSTABLE DAMPER" by Ericksen et al., assigned to the assignee of the present application, and is hereby incorporated by reference in its entirety herein.

The application with Ser. No. 13/843,704, claims the benefit of and claims priority of U.S. provisional patent application Ser. No. 61/709,041, filed on Oct. 2, 2012, entitled "METHOD AND APPARATUS FOR AN ADJUSTABLE DAMPER" by Ericksen et al., assigned to the assignee of the present application, and is hereby incorporated by reference in its entirety herein.

The application with Ser. No. 13/843,704, claims priority of U.S. provisional patent application Ser. No. 61/667,327, filed on Jul. 2, 2012, entitled "METHOD AND APPARATUS FOR AN ADJUSTABLE DAMPER" by Ericksen et al., assigned to the assignee of the present application, and is hereby incorporated by reference in its entirety herein.

The application with Ser. No. 14/251,446 is a continuation-in-part application of and claims the benefit of U.S. patent application Ser. No. 13/485,401, now Abandoned, filed on May 31, 2012, entitled "METHODS AND APPARATUS FOR POSITION SENSITIVE SUSPENSION DAMPING" by Ericksen et al., assigned to the assignee of the present application, and is hereby incorporated by reference in its entirety herein.

The application with Ser. No. 13/485,401 claims the benefit of and claims priority of U.S. provisional patent application Ser. No. 61/491,858, filed on May 31, 2011, entitled "METHODS AND APPARATUS FOR POSITION SENSITIVE SUSPENSION DAMPENING" by Ericksen et al., assigned to the assignee of the present application, and is hereby incorporated by reference in its entirety herein.

The application with Ser. No. 13/485,401 claims the benefit of and claims priority of U.S. provisional patent application Ser. No. 61/645,465, filed on May 10, 2012, entitled "METHOD AND APPARATUS FOR AN ADJUSTABLE DAMPER" by Cox et al., assigned to the assignee of the present application, and is hereby incorporated by reference in its entirety herein.

The application with Ser. No. 14/251,446 is a continuation-in-part application of and claims the benefit of U.S. patent application Ser. No. 12/684,072, now Abandoned, filed on Jan. 7, 2010, entitled "REMOTELY OPERATED BYPASS FOR A SUSPENSION DAMPER" by John Marking, assigned to the assignee of the present application, and is hereby incorporated by reference in its entirety herein.

The application with Ser. No. 12/684,072 claims the benefit of and claims priority of U.S. provisional patent application Ser. No. 61/143,152, filed on Jan. 7, 2009, entitled "REMOTE BYPASS LOCK-OUT" by John Marking, assigned to the assignee of the present application, and is hereby incorporated by reference in its entirety herein.

The application with Ser. No. 14/251,446 is a continuation-in-part application of and claims the benefit of U.S. patent application Ser. No. 13/189,216, now Issued U.S. Pat. No. 9,239,090, filed on Jul. 22, 2011, entitled "SUSPENSION DAMPER WITH REMOTELY-OPERABLE VALVE" by John Marking, assigned to the assignee of the present application, and is hereby incorporated by reference in its entirety herein.

The application with Ser. No. 13/189,216 is a continuation-in-part application of and claims the benefit of U.S. patent application Ser. No. 13/010,697, now Issued U.S. Pat. No. 8,857,580, filed on Jan. 20, 2011, entitled "REMOTELY OPERATED BYPASS FOR A SUSPENSION DAMPER" by John Marking, assigned to the assignee of the present application, and is hereby incorporated by reference in its entirety herein.

The application with Ser. No. 13/010,697 claims the benefit of and claims priority of U.S. provisional patent application Ser. No. 61/296,826, filed on Jan. 20, 2010, entitled "BYPASS LOCK-OUT VALVE FOR A SUSPENSION DAMPER" by John Marking, assigned to the assignee of the present application, and is hereby incorporated by reference in its entirety herein.

The application with Ser. No. 13/189,216 is a continuation-in-part application of and claims the benefit of U.S. patent application Ser. No. 13/175,244, now Issued U.S. Pat. No. 8,627,932, filed on Jul. 1, 2011, entitled "BYPASS FOR A SUSPENSION DAMPER" by John Marking, assigned to the assignee of the present application, and is hereby incorporated by reference in its entirety herein.

The application with Ser. No. 13/175,244 claims the benefit of and claims priority of U.S. provisional patent application Ser. No. 61/361,127, filed on Jul. 2, 2010, entitled "BYPASS LOCK-OUT VALVE FOR A SUSPENSION DAMPER" by John Marking, assigned to the assignee of the present application, and is hereby incorporated by reference in its entirety herein.

FIELD OF THE INVENTION

Embodiments of the present technology generally relate to a damper assembly for a vehicle. More specifically, certain embodiments relate to a remotely operated bypass valve used in conjunction with a vehicle damper.

BACKGROUND

Vehicle suspension systems typically include a spring component or components and a damping component or components. Typically, mechanical springs, like helical springs are used with some type of viscous fluid-based damping mechanism and the two are mounted functionally in parallel. In some instances, features of the damper or spring are user-adjustable. What is needed is an improved method and apparatus for adjusting damping characteristics, including remote adjustment.

SUMMARY OF EMBODIMENTS

Embodiments include a vehicle suspension damper that comprises: a cylinder and a piston assembly, wherein the piston assembly includes a piston; a working fluid within the cylinder; a bypass cylinder surrounding the cylinder and defining a cylindrical bypass channel; an adjustable bypass port fluidly coupling an interior of the cylinder and the cylindrical bypass channel; and an active bypass valve coupled with the cylindrical bypass channel, the active bypass valve configured to adjust a working size of the adjustable bypass port to modify a flow of said working fluid through the adjustable bypass port.

Embodiments also include: active bypass valve for operation within a vehicle suspension damper, the active bypass valve comprising: a threaded plug coupled with an actuator arm, wherein the threaded plug is configured for being angularly displaced within a cylindrical bypass channel about a longitudinal axis of the threaded plug relative to a piston in response to movement of the actuator arm, wherein the cylindrical bypass channel is defined by a bypass cylinder surrounding a cylinder of the vehicle suspension damper; a rod disposed adjacent to the threaded plug, wherein the rod is configured for moving along the longitudinal axis within the cylindrical bypass channel in response to an angular displacement experienced by the threaded plug; and a sleeve disposed adjacent to the rod, wherein the sleeve is configured for moving along the longitudinal axis within the cylindrical bypass channel in response to the moving by the rod, wherein the sleeve provides an adjustment to a flow of a working fluid through an adjustable bypass port fluidly coupling an interior of the cylinder and the cylindrical bypass channel.

BRIEF DESCRIPTION OF THE DRAWINGS

So that the manner in which the above recited features can be understood in detail, a more particular description may be had by reference to embodiments, some of which are illustrated in the appended drawings. It is to be noted, however, that the appended drawings illustrate only typical embodiments of this invention and are therefore into to be considered limiting of its scope, for the invention may admit to other equally effective embodiments.

The drawings referred to in this description should be understood as not being drawn to scale except if specifically noted.

DESCRIPTION OF EMBODIMENTS

The detailed description set forth below in connection with the appended drawings is intended as a description of various embodiments of the present invention and is not intended to represent the only embodiments in which the present invention may be practiced. Each embodiment described in this disclosure is provided merely as an example or illustration of the present invention, and should not necessarily be construed as preferred or advantageous over other embodiments. In some instances, well known methods, procedures, objects, and circuits have not been described in detail as not to unnecessarily obscure aspects of the present disclosure.

Overview of Discussion

Embodiments disclosed herein provide a damping mechanism for a vehicle suspension damper in which a bypass cylinder surrounds a cylinder of the vehicle suspension damper, thereby defining a cylindrical bypass channel. An adjustable bypass port fluidly couples the interior of the cylinder with the cylindrical bypass channel. An active bypass valve functions within the cylindrical bypass channel to meter the flow of working fluid (or damping fluid) from the interior of the cylinder, through the adjustable bypass port leading to the cylindrical bypass channel, and ultimately to a rebound portion of the cylinder. In some embodiments, the active bypass valve operates in conjunction with other damping mechanisms integrated within the vehicle suspension damper.

The following discussion will begin with a general description of a vehicle suspension damper, including the active bypass valve, in accordance with an embodiment. (See FIG. 1). The discussion continues with a detailed description of the active bypass valve, in accordance with an embodiment. (See FIGS. 2-5)

In the following discussion, the term "active" means adjustable, electronic, manipulatable, etc. while "passive" means fixed or not changeable. Thus, an active valve is a valve which automatically adjusts itself based on characteristics of the vehicle, the suspension, received user input, or the like, in which the valve is used.

As used herein, the terms "down", "up", "down-ward", "upward", "lower", "upper" and other direction references are relative and are used for reference only.

Example Vehicle Suspension Damper with Active Bypass Valve

Figure 1:
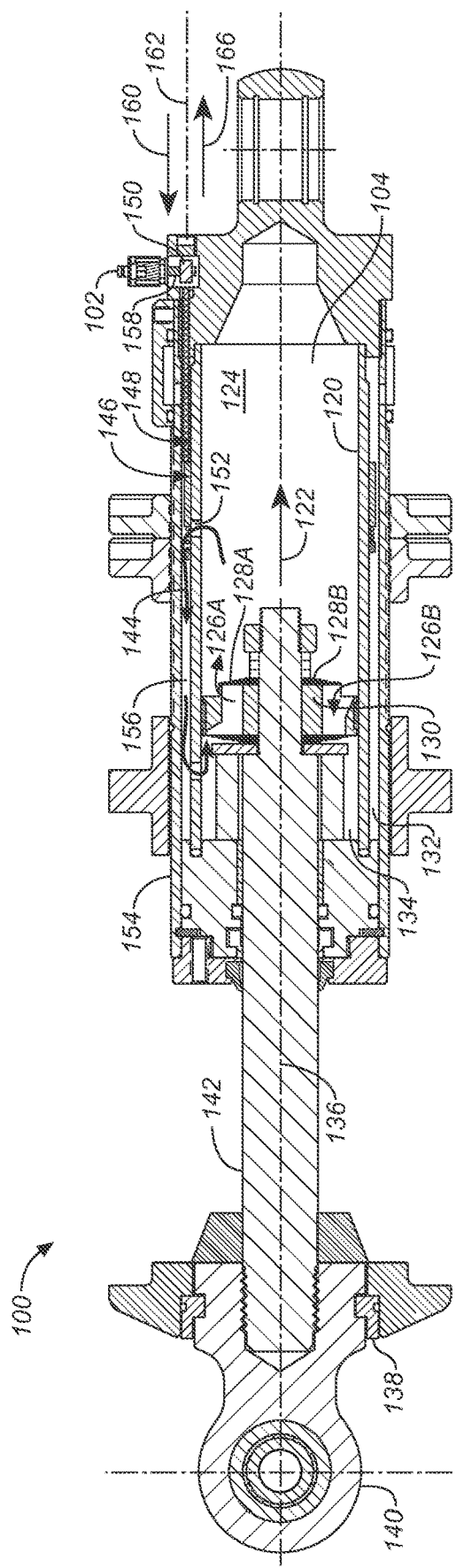
FIG. 1 is a section view showing a vehicle suspension damper with a bypass, in accordance with an embodiment.

FIG. 1 illustrates a vehicle suspension damper 100 with a live or active bypass valve 102, in accordance with an embodiment. The vehicle suspension damper 100 includes a cylinder 120 having an interior 124, a first end 132, a second end 106 and defining an axis 136. The vehicle suspension damper 100 further includes a piston rod 142 and a piston 130. The piston 130 is movably mounted within the cylinder 120 for moving between the first end 132 and the second end 106. A bypass cylinder 154 surrounds the cylinder 120 and defines a cylindrical bypass channel 156. The adjustable bypass port 152, when open, fluidly couples the interior 124 of the cylinder 120 and the cylindrical bypass channel 156, permitting some working fluid to bypass the vented piston 130 when the piston 130 is positioned on the rebound portion 134 side of the adjustable bypass port 152. The adjustable bypass port 152, when partially blocked, fluidly couples the interior 124 of the cylinder 120 and the cylindrical bypass channel 156, permits less working fluid (e.g., a lesser amount of working fluid than when the adjustable bypass port 152 is fully open) to bypass the vented piston 130 when the piston 130 is positioned on the rebound portion 134 side of the adjustable bypass port 152. The adjustable bypass port 152, when completely blocked, fluidly couples the interior 124 of the cylinder 120 and the cylindrical bypass channel 156, permits no working fluid to bypass the vented piston 130 when the piston 130 is positioned on the rebound portion 134 side of the adjustable bypass port 152.

In one embodiment, the fluid meters from one side of the piston 130 to the other side by passing through flow paths 126A and 126B formed in the piston 130. In the embodiment shown, shims 128A and 128B are used to partially obstruct the flow paths 126A and 126B in each direction. By selecting shims 128A and 128B having certain desired stiffness characteristics, the damping effects caused by the piston 130 can be increased or decreased and damping rates can be different between the compression and rebound strokes of the piston 130. For example, shims 128A are configured to meter rebound flow from the rebound portion 134 of the cylinder 120 to the compression portion 104 of the cylinder 120. Shims 128B, on the other hand, are configured to meter compression flow from the compression portion 104 of the cylinder 120 to the rebound portion 134. In one embodiment, shims 128B are not included on the rebound portion side, nor is there a compression flow path such as flow path 126B, leaving the piston 130 essentially "locked out" in the compression stroke without some means of flow bypass. Note that piston apertures (not shown) may be included in planes other than those shown (e.g. other than apertures used by flow paths 126A and 126B) and further that such apertures may, or may not, be subject to the shims 128A and 128B as shown (because for example, the shims 128A and 128B may be clover-shaped or have some other non-circular shape). In one embodiment, the piston 130 is solid and all working fluid flow must traverse a flow bypass and/or communicate with a reservoir.

The upper portion of the piston rod 142 is supplied with a bushing set 138 for connecting to a portion of a vehicle component such as a wheel suspension linkage. In another embodiment, not shown, the upper portion of the piston rod 142 (opposite the piston 130) may be supplied with an eyelet 140 to be mounted to one part of the vehicle, while the lower part of the vehicle suspension damper 100 is attached to another portion of the vehicle, such as the frame, and moves independently of the first part. A spring member (not shown) is usually mounted to act between the same portions of the vehicle as the vehicle suspension damper. As the piston rod 142 and the piston 130 move into the cylinder 120 (during compression), the working fluid slows the movement of the two portions of the vehicle relative to each other due, at least in part, to the incompressible fluid moving through the shimmed flow paths 126B (past shims 128B) provided in the piston 130 and/or through an adjustable bypass port 152, as will be described herein. As the piston rod 142 and the piston 130 move out of the cylinder 120 (during extension or "rebound"), fluid meters again through shimmed flow paths 126A and the flow rate and corresponding rebound rate is controlled, at least in part, by the shims 128A. In FIG. 1, the piston 130 is shown at full extension and moving downward in a compression stroke, the movement shown by arrow 122.

Example Active Bypass Valve

Figure 2A:
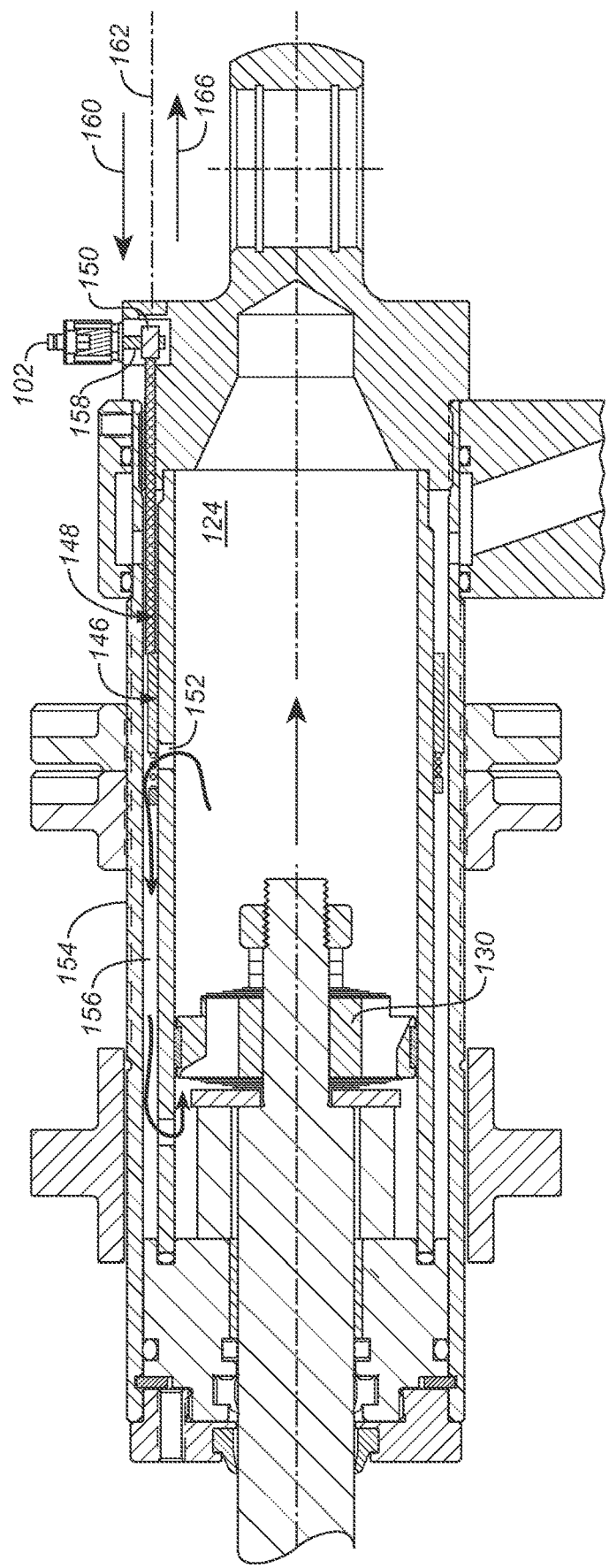
FIG. 2A is an enlarged section view showing an active bypass valve, in accordance with an embodiment.
Figure 2B:
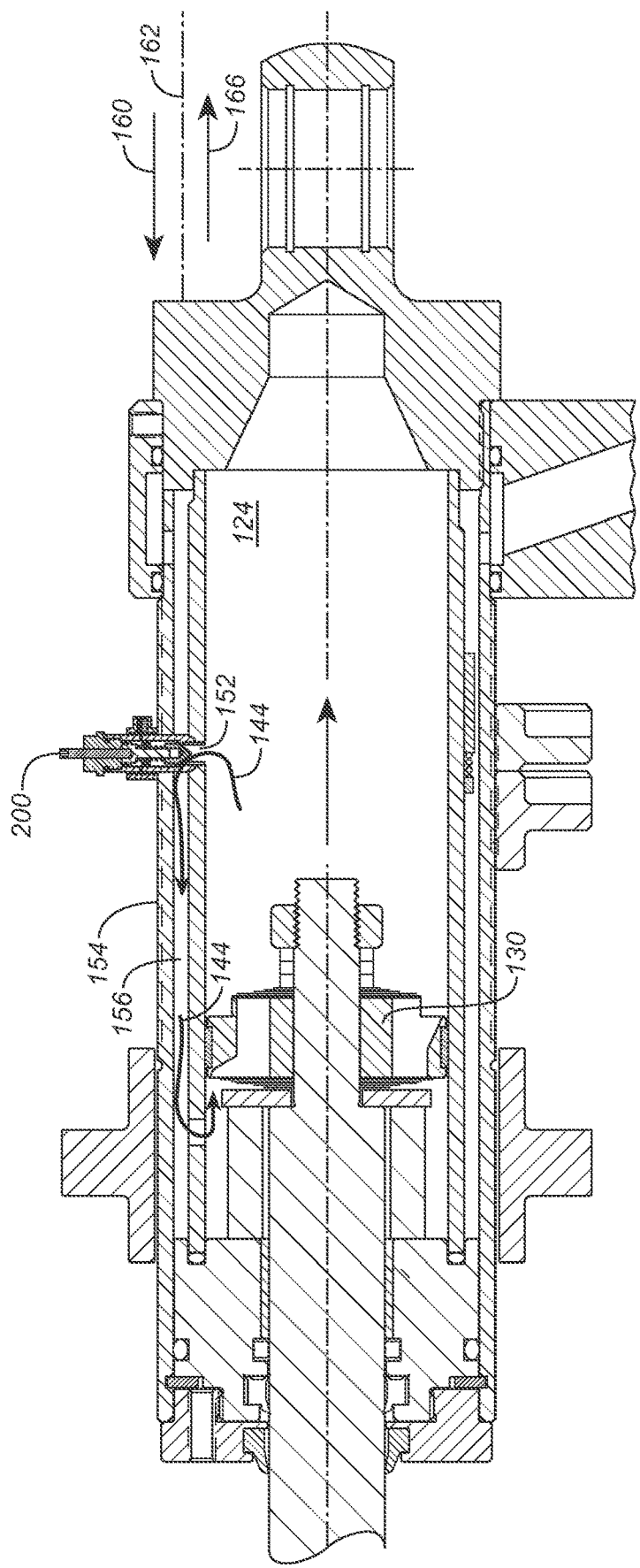
FIG. 2B is an enlarged section view showing an active bypass valve in a second configuration, in accordance with an embodiment.

FIG. 2A is an enlarged view showing the active bypass valve 102, in accordance with an embodiment. As noted, the adjustable bypass port 152, when open, fluidly couples the interior 124 of the cylinder 120 with the cylindrical bypass channel 156, according to an embodiment. The adjustable bypass port 152 permits the working fluid to travel from a first side of the piston 130 to the other side without traversing shimmed flow paths 126A and 125B that may otherwise be traversed in a compression stroke of the vehicle suspension damper 100. In FIGS. 1 and 2A-B, the adjustable bypass port 152 is shown in an "open" position with the flow of fluid through the bypass shown by arrows 144 from a compression side to a rebound side of the piston 130.

In one embodiment, the entry pathway to the adjustable bypass port 152 in the embodiment shown in FIGS. 1 and 2A-B is located between the middle and the second end 106 of the cylinder 120. In one embodiment, as selected by design (e.g., axial location of the entry pathway to the adjustable bypass port 152), the adjustable bypass port 152 will not operate after the piston 130 passes the entry to the adjustable bypass port 152 near the end of a compression stroke (or elsewhere in the stroke as desired). In one embodiment, this "position sensitive" feature ensures increased damping will be in effect near the end of the compression stroke to help prevent the piston 130 from approaching a "bottomed out" position (e.g. impact) in the cylinder 120. The adjustable bypass port 152 and the active bypass valve 102 of the present embodiments can be used in any combination with the bypass valves shown and described in co-pending U.S. patent application Ser. Nos. 13/010,697.

The active bypass valve 102, in accordance with embodiments, includes a threaded plug 150, a rod 148 and a sleeve 146 disposed within the cylindrical bypass channel 156. In brief, movement of the actuator arm 158 causes the threaded plug 150 to push the rod 148. The rod 148 then pushes the sleeve 146. The sleeve 146 then moves to at least partially cover the adjustable bypass port 152. More particularly, the actuator arm 158 is operatively connected to the threaded plug 150 such that the threaded plug 150 can be angularly displaced in the direction of arrow 160 about its longitudinal axis 162 relative to the piston 130 in response to operation of the actuator arm 158. The actuator arm 158 is secured on the threaded plug 150. The actuator arm 158 extends radially outwardly from the threaded plug 150 such that the threaded plug 150 can be angularly displaced about its longitudinal axis 162 relative to the piston 130 in response to angular displacement of the actuator arm 158 relative to the piston 130. Of note, depending on the movement of the actuator arm 158, the sleeve 146 may occupy a position within the cylindrical bypass channel 156 such that the sleeve 146 completely blocks the opening of the adjustable bypass port 152, partially blocks the opening of the adjustable bypass port 152, or does not block the opening of the adjustable bypass port 152 at all.

In one embodiment, instead of (or in addition to) restricting the working size of adjustable bypass port 152, active bypass valve 102 can vary a flow rate through an inlet or outlet passage within the active bypass valve 102, itself. See, as an example, the electronic valve of FIGS. 2-4 of U.S. Pat. No. 9,353,818 which is incorporated by reference herein, in its entirety, as further example of different types of "electronic" or "active" valves). Thus, the active bypass valve 102, can be used to meter the working fluid flow (e.g., control the rate of working fluid flow) in bypass channel 156 with/or without adjusting the working size (e.g., covering, uncovering, or partially covering the opening) of the adjustable bypass port 152.

For example, active bypass valve 102, when open, permits a first flow rate of the working fluid to travel through the cylindrical bypass channel 156. In contrast, when active bypass valve 102 is partially closed, a second flow rate of the working fluid though cylindrical bypass channel 156 occurs. The second flow rate is less than the first flow rate but greater than no flow rate. When active bypass valve 102 is completely closed, the flow rate of the working fluid though cylindrical bypass channel 156 is statistically zero.

As can be seen in FIGS. 1-3B, due to the active bypass valve 102 arrangement, a relatively small solenoid (using relatively low amounts of power) can generate relatively large damping forces. Furthermore, due to incompressible fluid inside the vehicle suspension damper 100, damping occurs as the adjustable bypass port 152 size is reduced to the movement of sleeve 146. The result is a controllable damping rate. Certain active valve and bypass features are described and shown in U.S. Pat. Nos. 9,120,362; 8,627,932; 8,857,580; 9,033,122; and 9,239,090 which are incorporated herein, in their entirety, by reference.

It should be appreciated that when the actuator arm 158 rotates in a reverse direction than that described above and herein, the threaded plug 150 moves in the direction of the arrow 166. As the threaded plug 150 moves in the direction of the arrow 166, the rod 148, and hence also the sleeve 146, moves in the direction of the arrow 166, and the adjustable bypass port 152 is at least partially opened. In one embodiment, upon the movement of the threaded plug 150 in the direction of the arrow 166, the rod 148 and the sleeve 146 moves in the direction of the arrow 166 due to gravity and/or the force applied by the working fluid against the sleeve 146 from the interior 124 of the cylinder 120 and toward the cylindrical bypass channel 156.

Thus, in addition to the damping features provided by the shims 128A and 128B through the flow paths 126A and 126B, embodiments enable the metering of working fluid from the interior 124 of the cylinder 120 to the rebound portion 134 of the vehicle suspension damper 100, via the active bypass valve 102 applied to the adjustable bypass port 152.

FIG. 2B illustrates a vehicle suspension damper 100 with another embodiment of an active bypass valve 200 which is a different configuration than active bypass valve 102 (as shown in detail in FIG. 6) but which operates in the same overall manner and with the same processes as described with respect to FIG. 2A, except that the control of the fluid flow is performed through active bypass valve 200 instead of using the sleeve type of configuration of active bypass valve 102. In FIG. 2B, active bypass valve 200 extends from suspension damper 100 while the valving portion of active bypass valve 200 remains within the internal bypass configuration of suspension damper 100.

Figure 3A:
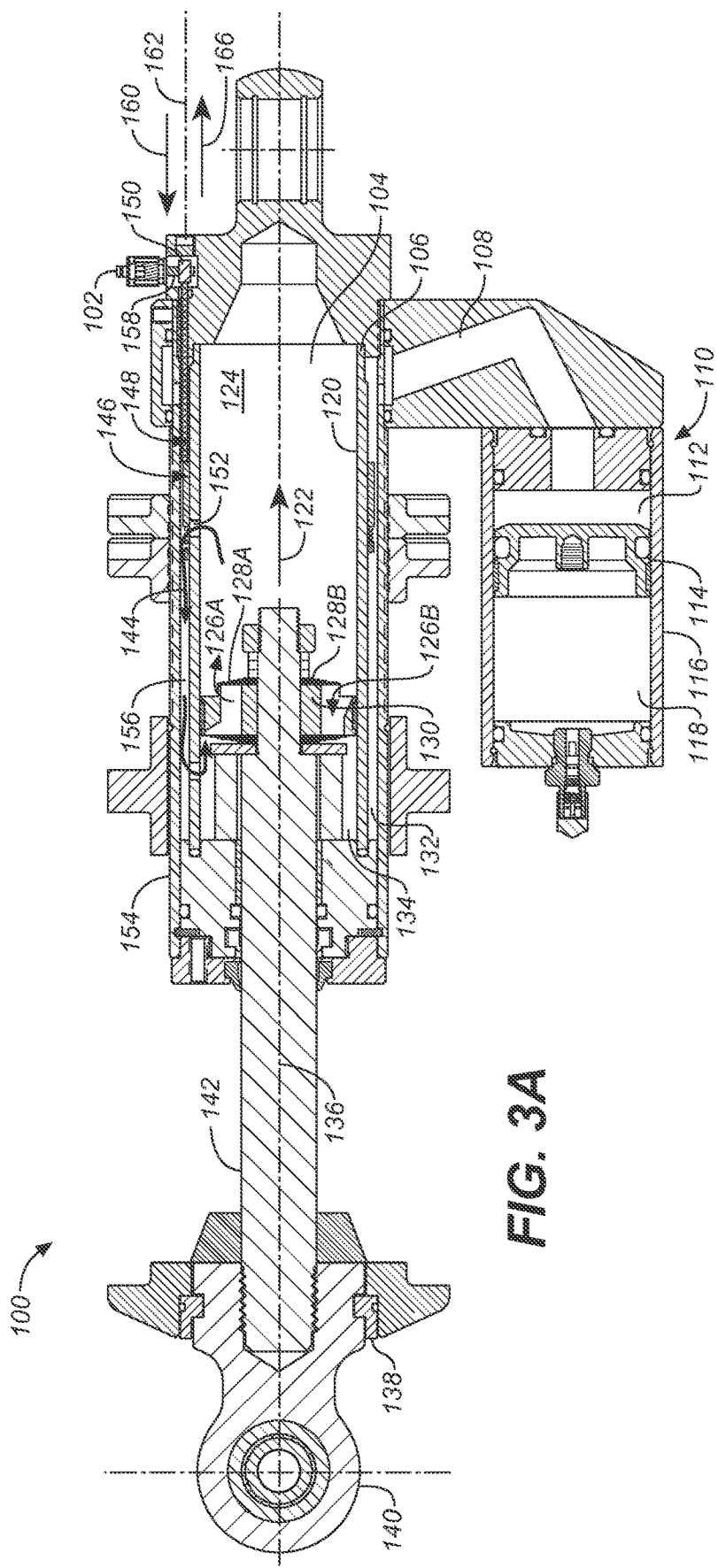
FIG. 3A is a section view showing a vehicle suspension damper with an active bypass valve and a reservoir, in accordance with an embodiment.

FIG. 3A illustrates a vehicle suspension damper 100 with an active bypass valve 102 and a reservoir 110, in accordance with an embodiment. In FIG. 3A, reservoir 110 is in fluid communication with the cylinder 120 for receiving and supplying working fluid as the piston rod 142 moves in and out of the cylinder 120. The reservoir 110 includes a reservoir cylinder 116 in fluid communication with the compression portion 104 of the cylinder 120 via the fluid conduit 108. The reservoir 110 also includes a floating piston 114 with a volume of gas on a backside 118 ("blind end" side) of it, the gas being compressible as the reservoir cylinder 116, on the "frontside" 112 fills with working fluid due to movement of the piston rod 142 and the piston 130 into the cylinder 120. Certain features of reservoir type dampers are shown and described in U.S. Pat. No. 7,374,028, which is incorporated herein, in its entirety, by reference.

In one embodiment, the active bypass valve 102 is a live valve. That is, one or more of components of active bypass valve 102 (e.g., rod 148, sleeve 146 or the like) will be actuated automatically based on actual terrain conditions. For example, rod 148 and/or sleeve 146 are controlled by a servo within active bypass valve 102 which will automatically operate rod 148 and/or sleeve 146 to open, close or partially cover the adjustable bypass port 152 with sleeve 146 which will increase or reduce the working size of adjustable bypass port 152 to modify the flowrate of the fluid between the compression portion 104 of the cylinder 120 and the rebound portion 134 via the bypass channel 156.

In one embodiment, the live operation includes an active signal received by a receiver at active bypass valve 102 from a computing device. For example, the user would have an app on a smart phone (or other computing device) and would control the settings via the app. Thus, when the user wanted to adjust the flowrate of the fluid between the compression portion 104 of the cylinder 120 and the rebound portion 134, via the bypass channel 156, they would provide the proper command from the computing device and it would be received at active bypass valve 102 which would then automatically operate rod 148 and/or sleeve 146 causing sleeve 146 to cover, uncover, partially cover, or partially uncover adjustable bypass port 152.

Figure 3B:
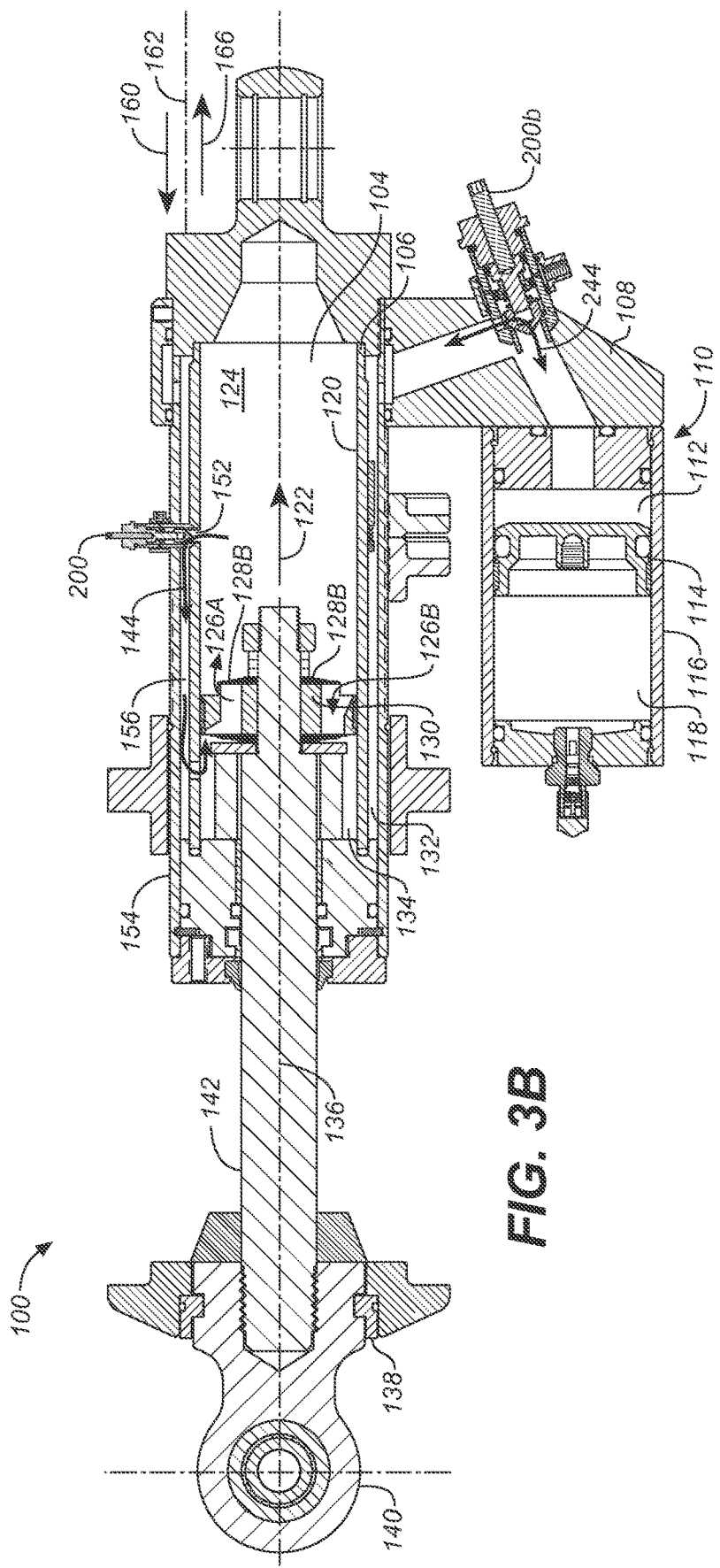
FIG. 3B is a section view showing a vehicle suspension damper with an active bypass valve having a second configuration and a reservoir, in accordance with an embodiment.

FIG. 3B illustrates a vehicle suspension damper 100 with another embodiment of an active bypass valve 200, a reservoir 110, and an additional active valve 200b (which is similar to the active valve 102 and/or 200 as described herein, except that it is provided in fluid conduit 108 instead of in a bypass configuration), in accordance with an embodiment. In FIG. 3B, reservoir 110 is similar to reservoir 110 of FIG. 3A, except for the addition of active valve 200b in the fluid conduit 108 which can open or close the flow path between the reservoir 110 and the vehicle suspension damper 100 as indicated by flow arrows 244.

In one embodiment, a portion of active bypass valve 200 extends from suspension damper 100 while the valving portion of active bypass valve 200 remains within the internal bypass configuration of suspension damper 100.

Figure 4:
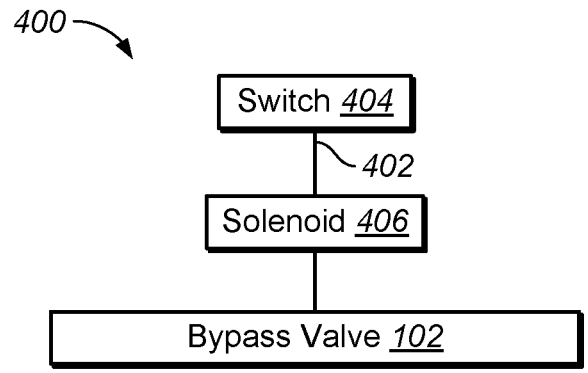
FIG. 4 is a schematic diagram showing a control arrangement for a remotely-operated bypass valve, in accordance with an embodiment.
Figure 5:
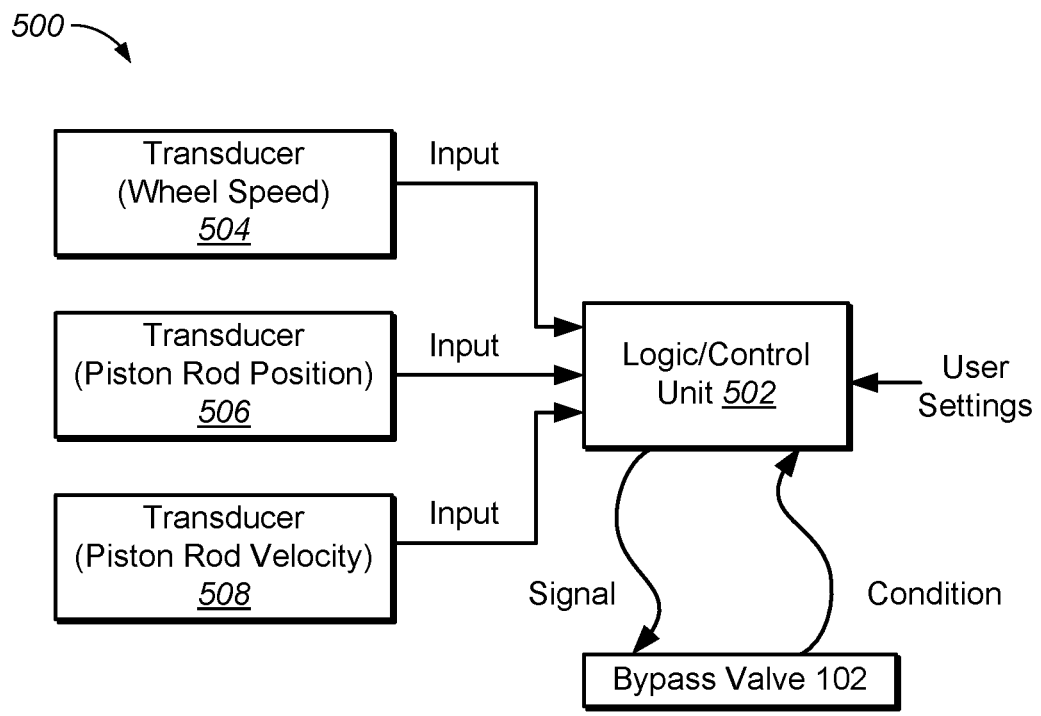
FIG. 5 is a schematic diagram of a control system based upon any or all of vehicle speed, damper rod speed, and damper rod position, in accordance with an embodiment.
Figure 6:
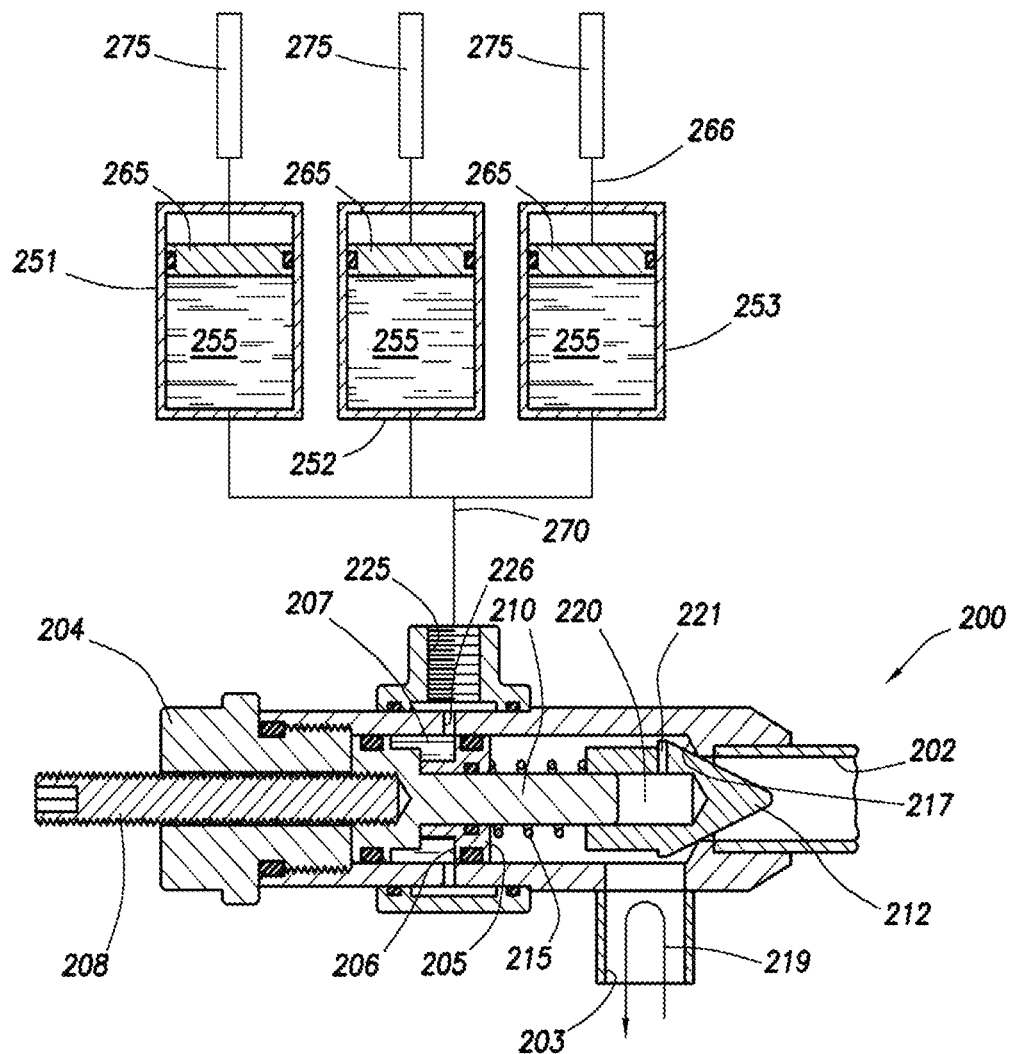
FIG. 6 is an enlarged section view showing an active bypass valve and a plurality of valve operating cylinders in selective communication with an annular piston surface of the valve, in accordance with an embodiment.

Both the active bypass valve 200 and active valve 200b are live valves as described in further detail in FIGS. 4-6. In one embodiment, active bypass valve 200 will be actuated automatically based on actual terrain conditions. For example, active bypass valve 200 is operated as discussed in FIGS. 4-6 to open, close or partially allow flow through bypass port 152 to modify the flowrate of the fluid between the compression portion 104 of the cylinder 120 and the rebound portion 134 via the bypass channel 156.

In one embodiment, the live operation includes an active signal received by a receiver at active bypass valve 200 and/or active valve 200b from a computing system. Thus, to adjust the flowrate of the fluid between the compression portion 104 of the cylinder 120 and the rebound portion 134, via the bypass channel 156, the command would be provided from the computing system and received at active bypass valve 200 which would then automatically open, close or partially allow fluid flow through bypass port 152. Similarly, the computing system can provide an active signal received by a receiver at active valve 200b to adjust the flowrate of the fluid between the compression portion 104 of the cylinder 120 and the reservoir 110, via the fluid conduit 108, the would be provided from the computing system and received at active valve 200b which would then automatically open, close or partially allow fluid flow through fluid conduit 108.

Although two active valves are shown in FIG. 3B, it is understood that any number of active valves corresponding to any number of fluid channels (e.g., bypass channels, reservoir channels, bottom out channels, etc.) for a corresponding number of vehicle suspension dampers could be used alone or in combination. That is, one or more active valves could be operated simultaneously or separately depending upon needs in a vehicular suspension system. For example, a suspension damper could have one, a combination of, or each of an active valve(s): for an internal bypass, for an external bypass, for a fluid conduit 108 to the reservoir 110, etc. In other words, anywhere there is a fluid flow path within a suspension damper 100, an active valve could be used. Moreover, the active valve could be alone or used in combination with other active valves at other fluid flow paths to automate one or more of the damping performance characteristics of the dampening assembly. Moreover, additional switches could permit individual operation of separate active bypass valves.

Referring now to FIG. 4, in various embodiments of the present invention, suspension damper includes a bypass channel 156 having an adjustable bypass port 152, such that the flowrate of the fluid between the compression portion 104 of the cylinder 120 and the rebound portion 134, via the bypass channel 156, is automatically adjustable using active bypass valve 102 to move rod 148 and/or sleeve 146 causing sleeve 146 to change the working size of adjustable bypass port 152. In one such embodiment, active bypass valve 102 is solenoid operated, hydraulically operated, pneumatically operated, or operated by any other suitable motive mechanism. Active bypass valve 102 may be operated remotely by a switch or potentiometer located in the cockpit of a vehicle or attached to appropriate operational parts of a vehicle for timely activation (e.g. brake pedal) or may be operated in response to input from a microprocessor (e.g. calculating desired settings based on vehicle acceleration sensor data) or any suitable combination of activation means. In like manner, a controller for active bypass valve 102 may be cockpit mounted and may be manually adjustable or microprocessor controlled or both or selectively either.

It may be desirable to increase the damping rate or effective stiffness of vehicle suspension damper 100 when moving a vehicle from off-road to on highway use. Off-road use often requires a high degree of compliance to absorb shocks imparted by the widely varying terrain. On highway use, particularly with long wheel travel vehicles, often requires more rigid shock absorption to allow a user to maintain control of a vehicle at higher speeds. This may be especially true during cornering or braking.

One embodiment comprises a four-wheeled vehicle having vehicle suspension damper 100 equipped with a bypass channel 156 wherein the flowrate of the fluid between the compression portion 104 of the cylinder 120 and the rebound portion 134 via the bypass channel 156 is automatically adjustable using active bypass valve 102 at each (of four) wheel.

For example, the opening size of adjustable bypass port 152 which controls the flowrate of the fluid between the compression portion 104 of the cylinder 120 and the rebound portion 134, via the bypass channel 156, is automatically adjusted by active bypass valve 102 (including, for example, a remotely controllable active bypass valve 102). In one embodiment, each of the front shock absorbers may be electrically connected with a linear switch (such as that which operates an automotive brake light) that is activated in conjunction with the vehicle brake. When the brake is moved beyond a certain distance, corresponding usually to harder braking and hence potential for vehicle nose dive, the electric switch connects a power supply to a motive force generator for active bypass valve 102 in the front shocks causes active bypass valve 102 to automatically move rod 148 and/or sleeve 146 and cause sleeve 146 to cover or partially cover more of adjustable bypass port 152.

In so doing, the reduction in the size of adjustable bypass port 152 increases the stiffness of that shock. As such, the front shocks become more rigid during hard braking. Other mechanisms may be used to trigger the shocks such as accelerometers (e.g. tri-axial) for sensing pitch and roll of the vehicle and activating, via a microprocessor, the appropriate amount of rotation of active bypass valve 102 to cause sleeve 146 to cover, uncover, partially cover, or partially uncover adjustable bypass port 152 (and corresponding adjustment of the size of adjustable bypass port 152 modifies the flowrate of the fluid between the compression portion 104 of the cylinder 120 and the rebound portion 134, via the bypass channel 156, for the corresponding vehicle suspension damper 100) for optimum vehicle control.

In one embodiment, a vehicle steering column includes right turn and left turn limit switches such that a hard turn in either direction activates the appropriate adjustment of active bypass valve 102 to cause sleeve 146 to cover, uncover, partially cover, or partially uncover adjustable bypass port 152 (and corresponding adjustment of the size of adjustable bypass port 152 modifies the flowrate of the fluid between the compression portion 104 of the cylinder 120 and the rebound portion 134, via the bypass channel 156, for the corresponding vehicle suspension damper 100) of shocks opposite that direction (for example, a hard, right turn would cause more rigid shocks on the vehicle's left side). Again, accelerometers in conjunction with a microprocessor and a switched power supply may perform the active bypass valve 102 activation function by sensing the actual g-force associated with the turn (or braking; or acceleration for the rear shock activation) and triggering the appropriate amount of rotation of active bypass valve 102 to cause sleeve 146 to cover, uncover, partially cover, or partially uncover adjustable bypass port 152 (and corresponding adjustment of the size of adjustable bypass port 152 modifies the flowrate of the fluid between the compression portion 104 of the cylinder 120 and the rebound portion 134, via the bypass channel 156, for the corresponding vehicle suspension damper 100) at a preset acceleration threshold value (e.g., a g-force).

FIG. 4 is a schematic diagram showing a control arrangement 400 for a remotely-operated active bypass valve 102. As illustrated, a signal line 402 runs from a switch 404 to a solenoid 406. Thereafter, the solenoid 406 converts electrical energy into mechanical movement and shifts position of active bypass valve 102, thereby adjusting the location of rod 148 and/or sleeve 146 and causing sleeve 146 to cover, uncover, partially cover, or partially uncover adjustable bypass port 152. Adjusting the size of adjustable bypass port 152 modifies the flowrate of the fluid between the compression portion 104 of the cylinder 120 and the rebound portion 134, via the bypass channel 156, thereby varying the stiffness of a corresponding vehicle suspension damper 100.

As discussed, a remotely-operable active bypass valve 102 like the one described above is particularly useful with an on-/off-road vehicle. These vehicles can have more than 20" of shock absorber travel to permit them to negotiate rough, uneven terrain at speed with usable shock absorbing function. In off-road applications, compliant dampening is necessary as the vehicle relies on its long travel suspension when encountering often large off-road obstacles. Operating a vehicle with very compliant, long travel suspension on a smooth road at road speeds can be problematic due to the springiness/sponginess of the suspension and corresponding vehicle handling problems associated with that (e.g. turning roll, braking pitch). Such compliance can cause reduced handling characteristics and even loss of control. Such control issues can be pronounced when cornering at high speed as a compliant, long travel vehicle may tend to roll excessively. Similarly, such a vehicle may include excessive pitch and yaw during braking and/or acceleration. With the remotely-operated active bypass valve 102, the working size of adjustable bypass port 152 is automatically adjusted thereby modifying the communication of fluid between the compression portion 104 of the cylinder 120 and the rebound portion 134 via the bypass channel 156. Correspondingly, the dampening characteristics of vehicle suspension damper 100 can be changed.

In addition to, or in lieu of, the simple, switch-operated remote arrangement of FIG. 4, the remotely-operable active bypass valve 102 can be operated automatically based upon one or more driving conditions. FIG. 5 shows a schematic diagram of a control system 500 based upon any or all of vehicle speed, damper rod speed, and damper rod position.

One embodiment of the arrangement of FIG. 5 is designed to automatically increase dampening in a shock absorber in the event a damper rod reaches a certain velocity in its travel towards the bottom end of a damper at a predetermined speed of the vehicle. In one embodiment, the control system 500 adds dampening (and control) in the event of rapid operation (e.g. high rod velocity) of the vehicle suspension damper 100 to avoid a bottoming out of the damper rod as well as a loss of control that can accompany rapid compression of a shock absorber with a relative long amount of travel. In one embodiment, the control system 500 adds dampening (e.g., adjusts the size of the opening of adjustable bypass port 152 by causing sleeve 146 to cover, uncover, partially cover, or partially uncover adjustable bypass port 152) in the event that the rod velocity in compression is relatively low but the rod progresses past a certain point in the travel.

Such configuration aids in stabilizing the vehicle against excessive low-rate suspension movement events such as cornering roll, braking and acceleration yaw and pitch and "g-out."

FIG. 5 illustrates, for example, a control system 500 including three variables: wheel speed, corresponding to the speed of a vehicle component (measured by wheel speed transducer 504), piston rod position (measured by piston rod position transducer 506), and piston rod velocity (measured by piston rod velocity transducer 508). Any or all of the variables shown may be considered by logic unit 502 in controlling the solenoids or other motive sources coupled to active bypass valve 102 for changing the working size of the opening of adjustable bypass port 152 by causing sleeve 146 to cover, uncover, partially cover, or partially uncover adjustable bypass port 152. Any other suitable vehicle operation variable may be used in addition to or in lieu of the variables 504, 506, and 508 such as, for example, piston rod compression strain, eyelet strain, vehicle mounted accelerometer (or tilt/inclinometer) data or any other suitable vehicle or component performance data.

In one embodiment, the piston's position within the damping chamber is determined using an accelerometer to sense modal resonance of the suspension damper. Such resonance will change depending on the position of the piston and an on-board processor (computer) is calibrated to correlate resonance with axial position. In one embodiment, a suitable proximity sensor or linear coil transducer or other electro-magnetic transducer is incorporated in the damping chamber to provide a sensor to monitor the position and/or speed of the piston (and suitable magnetic tag) with respect to a housing of the suspension damper.

In one embodiment, the magnetic transducer includes a waveguide and a magnet, such as a doughnut (toroidal) magnet that is joined to the cylinder and oriented such that the magnetic field generated by the magnet passes through the rod and the waveguide. Electric pulses are applied to the waveguide from a pulse generator that provides a stream of electric pulses, each of which is also provided to a signal processing circuit for timing purposes. When the electric pulse is applied to the waveguide, a magnetic field is formed surrounding the waveguide. Interaction of this field with the magnetic field from the magnet causes a torsional strain wave pulse to be launched in the waveguide in both directions away from the magnet. A coil assembly and sensing tape is joined to the waveguide. The strain wave causes a dynamic effect in the permeability of the sensing tape which is biased with a permanent magnetic field by the magnet. The dynamic effect in the magnetic field of the coil assembly due to the strain wave pulse, results in an output signal from the coil assembly that is provided to the signal processing circuit along signal lines.

By comparing the time of application of a particular electric pulse and a time of return of a sonic torsional strain wave pulse back along the waveguide, the signal processing circuit can calculate a distance of the magnet from the coil assembly or the relative velocity between the waveguide and the magnet. The signal processing circuit provides an output signal, which is digital or analog, proportional to the calculated distance and/or velocity. A transducer-operated arrangement for measuring piston rod speed and velocity is described in U.S. Pat. No. 5,952,823 and that patent is incorporated by reference herein in its entirety.

While transducers located at the suspension damper measure piston rod velocity (piston rod velocity transducer 508), and piston rod position (piston rod position transducer 506), a separate wheel speed transducer 504 for sensing the rotational speed of a wheel about an axle includes housing fixed to the axle and containing therein, for example, two permanent magnets. In one embodiment, the magnets are arranged such that an elongated pole piece commonly abuts first surfaces of each of the magnets, such surfaces being of like polarity. Two inductive coils having flux-conductive cores axially passing therethrough abut each of the magnets on second surfaces thereof, the second surfaces of the magnets again being of like polarity with respect to each other and of opposite polarity with respect to the first surfaces. Wheel speed transducers are described in U.S. Pat. No. 3,986,118 which is incorporated herein by reference in its entirety.

In one embodiment, as illustrated in FIG. 5, the logic unit 502 with user-definable settings receives inputs from piston rod position transducer 506, piston rod velocity transducer 508, as well as wheel speed transducer 504. Logic unit 502 is user-programmable and, depending on the needs of the operator, logic unit 502 records the variables and, then, if certain criteria are met, logic unit 502 sends its own signal to active bypass valve 102 (e.g., the logic unit 502 is an activation signal provider) to cause active bypass valve 102 to move into the desired state (e.g., adjust the bypass flow rate). Thereafter, the condition, state or position of active bypass valve 102 is relayed back to logic unit 502 via an active bypass valve monitor or the like.

In one embodiment, logic unit 502 shown in FIG. 5 assumes a single active bypass valve 102 corresponding to a single adjustable bypass port 152 of a single vehicle suspension damper 100, but logic unit 502 is usable with any number of active bypass valves or groups of active bypass valves corresponding to any number of bypass channels, adjustable bypass ports, or groups of bypass channels or adjustable bypass ports. For instance, the suspension dampers on one side of the vehicle can be acted upon while the vehicles other suspension dampers remain unaffected.

While the examples illustrated relate to manual operation and automated operation based upon specific parameters, the remotely-operated active bypass valve 102 can be used in a variety of ways with many different driving and road variables. In one example, active bypass valve 102 is controlled based upon vehicle speed in conjunction with the angular location of the vehicle's steering wheel. In this manner, by sensing the steering wheel turn severity (angle of rotation), additional dampening (by adjusting the corresponding size of the opening of adjustable bypass port 152 by causing sleeve 146 to cover, uncover, partially cover, or partially uncover adjustable bypass port 152) can be applied to one vehicle suspension damper 100 or one set of vehicle suspension dampers on one side of the vehicle (suitable for example to mitigate cornering roll) in the event of a sharp turn at a relatively high speed.

In another example, a transducer, such as an accelerometer, measures other aspects of the vehicle's suspension system, like axle force and/or moments applied to various parts of the vehicle, like steering tie rods, and directs change to position of active bypass valve 102 (and corresponding change to the working size of the opening of adjustable bypass port 152 by causing sleeve 146 to cover, uncover, partially cover, or partially uncover adjustable bypass port 152) in response thereto. In another example, active bypass valve 102 is controlled at least in part by a pressure transducer measuring pressure in a vehicle tire and adding dampening characteristics to some or all of the wheels (by adjusting the working size of the opening of adjustable bypass port 152 by causing sleeve 146 to cover, uncover, partially cover, or partially uncover adjustable bypass port 152) in the event of, for example, an increased or decreased pressure reading.

In one embodiment, active bypass valve 102 is controlled in response to braking pressure (as measured, for example, by a brake pedal (or lever) sensor or brake fluid pressure sensor or accelerometer). In still another example, a parameter might include a gyroscopic mechanism that monitors vehicle trajectory and identifies a "spin-out" or other loss of control condition and adds and/or reduces dampening to some or all of the vehicle's dampers (by adjusting the working size of the opening of adjustable bypass port 152 by causing sleeve 146 to cover, uncover, partially cover, or partially uncover adjustable bypass port 152 chambers) in the event of a loss of control to help the operator of the vehicle to regain control.

FIG. 6 is an enlarged view showing an embodiment of a remotely operable active bypass valve 200. Although FIG. 6 shows the active bypass valve 200 in a closed position (e.g. during a rebound stroke of the damper), the following discussion also includes the opening of active bypass valve 200. Active bypass valve 200 includes a valve body 204 housing a movable piston 205 which is sealed within the body. The piston 205 includes a sealed chamber 207 adjacent an annularly-shaped piston surface 206 at a first end thereof. The chamber 207 and piston surface 206 are in fluid communication with a port 225 accessed via opening 226. Two additional fluid communication points are provided in the body including an inlet 202 and an outlet 203 for fluid passing through the active bypass valve 200.

Extending from a first end of the piston 205 is a shaft 210 having a cone-shaped valve member 212 (other shapes such as spherical or flat, with corresponding seats, will also work suitably well) disposed on an end thereof. The cone-shaped member 212 is telescopically mounted relative to, and movable on, the shaft 210 and is biased toward an extended position due to a spring 215 coaxially mounted on the shaft 210 between the member 212 and the piston 205. Due to the spring biasing, the cone-shaped member 212 normally seats itself against a seat 217 formed in an interior of the body 204.

As shown, the cone shaped member 212 is seated against seat 217 due to the force of the spring 215 and absent an opposite force from fluid entering the valve along path 156 from the cylindrical bypass channel 156 (of FIG. 2B). As member 212 telescopes out, a gap 220 is formed between the end of the shaft 210 and an interior of member 212. A vent 221 is provided to relieve any pressure formed in the gap. With a fluid path through the active bypass valve 200 (from 203 to 202) closed, fluid communication is substantially shut off from the rebound side of the cylinder into the valve body (and hence through the bypass back to the compression side) and its "dead-end" path is shown by arrow 219.

In one embodiment, there is a manual pre-load adjustment on the spring 215 permitting a user to hand-load or un-load the spring using a threaded member 208 that transmits motion of the piston 205 towards and away from the conical member, thereby changing the compression on the spring 215.

Also shown in FIG. 6 is a plurality of valve operating cylinders 251, 252, 253. In one embodiment, the cylinders each include a predetermined volume of fluid 255 that is selectively movable in and out of each cylindrical body through the action of a separate corresponding piston 265 and rod 266 for each cylindrical body. A fluid path 270 runs between each cylinder and port 225 of the valve body where annular piston surface 206 is exposed to the fluid.

Because each cylinder has a specific volume of substantially incompressible fluid and because the volume of the sealed chamber 207 adjacent the annular piston surface 206 is known, the fluid contents of each cylinder can be used, individually, sequentially or simultaneously to move the piston a specific distance, thereby effecting the dampening characteristics of the system in a relatively predetermined and precise way.

While the cylinders 251-253 can be operated in any fashion, in the embodiment shown each piston 265 and rod 266 is individually operated by a solenoid 275 and each solenoid, in turn, is operable from a remote location of the vehicle, like a cab of a motor vehicle or even the handlebar area of a motor or bicycle (not shown). Electrical power to the solenoids 275 is available from an existing power source of a vehicle or is supplied from its own source, such as on-board batteries. Because the cylinders may be operated by battery or other electric power or even manually (e.g. by syringe type plunger), there is no requirement that a so-equipped suspension rely on any pressurized vehicle hydraulic system (e.g. steering, brakes) for operation. Further, because of the fixed volume interaction with the bypass valve there is no issue involved in stepping from hydraulic system pressure to desired suspension bypass operating pressure.

In one embodiment, e.g., when active bypass valve 200 is in the damping-open position, fluid flow through the cylindrical bypass channel 156 provides adequate force on the member 212 to urge it backwards, at least partially loading the spring 215 and creating fluid path 201 from the cylindrical bypass channel 156 into a rebound portion 134 of the vehicle suspension damper 100.

The characteristics of the spring 215 are typically chosen to permit active bypass valve 200 (e.g. member 212) to open at a predetermined bypass pressure, with a predetermined amount of control pressure applied to inlet 225, during a compression stroke of vehicle suspension damper 100. For a given spring 215, higher control pressure at inlet 225 will result in higher bypass pressure required to open the active bypass valve 200 and correspondingly higher damping resistance in the cylindrical bypass channel 156 (more compression damping due to that bypass). In one embodiment, the control pressure at inlet 225 is raised high enough to effectively "lock" the bypass closed resulting in a substantially rigid compression damper (particularly true when a solid damping piston is also used).

In one embodiment, the valve is open in both directions when the valve member 212 is "topped out" against valve body 204. In another embodiment however, when the valve piston 205 is abutted or "topped out" against valve body 204 the spring 215 and relative dimensions of the active bypass valve 200 still allow for the cone member 212 to engage the valve seat 217 thereby closing the valve. In such embodiment backflow from the rebound side of the cylinder 102 to the compression side is always substantially closed and cracking pressure from flow along path 156 is determined by the pre-compression in the spring 215. In such embodiment, additional fluid pressure may be added to the inlet through port 225 to increase the cracking pressure for flow along path 156 and thereby increase compression damping through the bypass over that value provided by the spring compression "topped out." It is generally noteworthy that while the descriptions herein often relate to compression damping bypass and rebound shut off, some or all of the bypass channels (or channel) on a given suspension unit may be configured to allow rebound damping bypass and shut off or impede compression damping bypass.

The foregoing Description of Embodiments is not intended to be exhaustive or to limit the embodiments to the precise form described. Instead, example embodiments in this Description of Embodiments have been presented in order to enable persons of skill in the art to make and use embodiments of the described subject matter. Moreover, various embodiments have been described in various combinations. However, any two or more embodiments could be combined.

Although some embodiments have been described in a language specific to structural features and/or methodological acts, it is to be understood that the subject matter defined in the appended claims is not necessarily limited to the specific features or acts described above. Rather, the specific features and acts described above are disclosed by way of illustration and as example forms of implementing the claims and their equivalents.

It should be noted that any of the features disclosed herein may be useful alone or in any suitable combination. While the foregoing is directed to embodiments of the present invention, other and further embodiments of the invention may be implemented without departing from the scope of the invention, and the scope thereof is determined by the claims that follow.

What is claimed is:

1. A vehicle suspension damper comprising:
   a cylinder and a piston assembly, wherein said piston assembly comprises a piston, said piston separating a rebound side of said cylinder from a compression side of said cylinder;
   a working fluid within said cylinder;
   a bypass cylinder surrounding said cylinder and defining a cylindrical bypass channel, said cylindrical bypass channel fluidically coupling said rebound side of said cylinder and said compression side of said cylinder such that said working fluid is able to flow through said cylindrical bypass channel and between said rebound side of said cylinder and said compression side of said cylinder without passing through said piston;
   an active bypass valve coupled with said cylindrical bypass channel, said active bypass valve is configured to automatically adjust a meter of a fluid flow of said working fluid through said cylindrical bypass channel, said active bypass valve configured to automatically adjust itself based on characteristics selected from the group consisting of: vehicle characteristics, suspension characteristics, and received user input; and
   an adjustable bypass port fluidly coupling an interior of said cylinder and said cylindrical bypass channel, wherein said active bypass valve further comprises:

an actuator arm;
a threaded plug coupled with said actuator arm, wherein said threaded plug is configured for being angularly displaced within said cylindrical bypass channel about a longitudinal axis of said threaded plug relative to said piston in response to an operation of said actuator arm; and
a rod disposed adjacent to said threaded plug, wherein said rod is configured for moving along said longitudinal axis within said cylindrical bypass channel in response to an angular displacement experienced by said threaded plug.

2. The vehicle suspension damper of claim 1, wherein said working fluid travels through said cylindrical bypass channel from one side of said piston to another side of said piston at a first flow rate when said active bypass valve is in an open position.

3. The vehicle suspension damper of claim 2, wherein said working fluid travels through said cylindrical bypass channel from one side of said piston to another side of said piston at a second flow rate when said active bypass valve is in a partially open position,
the second flow rate of said working fluid is less than said first flow rate of said working fluid.

4. The vehicle suspension damper of claim 1, wherein none of said working fluid travels through said cylindrical bypass channel from one side of said piston to another side of said piston when said active bypass valve is in a closed position.

5. The vehicle suspension damper of claim 1, wherein said active bypass valve further comprises:
a sleeve coupled to said rod and extending from said rod along the same longitudinal axis as said rod, wherein said sleeve is configured for moving along said longitudinal axis within said cylindrical bypass channel in response to said moving by said rod, wherein said sleeve provides an adjustment to a working size of said adjustable bypass port.

6. The vehicle suspension damper of claim 1, further comprising:
a control system coupled to said active bypass valve, said control system comprising:
a sensor to obtain vehicle acceleration sensor data associated with a movement of a vehicle component of a vehicle;
a comparer to compare a value of said vehicle acceleration sensor data with a predetermined acceleration threshold value that corresponds to said vehicle component;
an active bypass valve monitor to monitor a state of said active bypass valve, wherein said state controls a damping force within said vehicle suspension damper; and
an activation signal provider to, based on said comparing and said monitoring, actuate said active bypass valve to automatically adjust the meter of the flow of said working fluid through said cylindrical bypass channel, such that a damping characteristic of said vehicle suspension damper is automatically modified.

7. A vehicle suspension damper comprising:
a cylinder and a piston assembly, wherein said piston assembly comprises a piston having a first side and a second side, said piston including a flow path formed through said piston;
a working fluid within said cylinder;
a bypass cylinder surrounding said cylinder and defining a cylindrical bypass channel, said cylindrical bypass channel fluidically coupling said first side of said piston and said second side of said piston, said cylindrical bypass channel providing a path for said working fluid to travel from said first side of said piston to said second side of said piston without traversing said flow path formed through said piston;
an active bypass valve coupled with said cylindrical bypass channel,
the active bypass valve having a flow path therethrough,
the active bypass valve automatically adjusts a meter of a flow of said working fluid through said cylindrical bypass channel, said active bypass valve configured to automatically adjust itself based on characteristics selected from the group consisting of: vehicle characteristics, suspension characteristics, and received user input; and
an adjustable bypass port fluidly coupling an interior of said cylinder and said cylindrical bypass channel, wherein said active bypass valve further comprises:
an actuator arm;
a threaded plug coupled with said actuator arm, wherein said threaded plug is configured for being angularly displaced within said cylindrical bypass channel about a longitudinal axis of said threaded plug relative to said piston in response to an operation of said actuator arm; and
a rod disposed adjacent to said threaded plug, said rod configured for moving perpendicular to said longitudinal axis of said threaded plug and parallel to a center axis of said vehicle suspension damper in response to an angular displacement of said threaded plug.

8. The vehicle suspension damper of claim 7, wherein an amount of said working fluid travels through said cylindrical bypass channel from said first side of said piston to said second side of said piston when said active bypass valve is in an open position.

9. The vehicle suspension damper of claim 8, wherein a lesser amount of said working fluid travels through said cylindrical bypass channel from said first side of said piston to said second side of said piston when said active bypass valve is in a partially open position.

10. The vehicle suspension damper of claim 7, wherein none of said working fluid travels through said cylindrical bypass channel from said first side of said piston to said second side of said piston when said active bypass valve is in a closed position.

11. The vehicle suspension damper of claim 7, further comprising:
a control system coupled to said active bypass valve, said control system comprising:
a sensor to obtain a vehicle acceleration sensor data associated with a movement of a vehicle component of said vehicle;
a comparer to compare a value of said vehicle acceleration sensor data with a predetermined acceleration threshold value that corresponds to said vehicle component;
an active bypass valve monitor to monitor a state of said active bypass valve, wherein said state controls a damping force within said vehicle suspension damper; and
an activation signal provider to, based on said comparing and said monitoring, actuate said active bypass valve to automatically adjust the meter of the flow of said working fluid through said cylindrical bypass channel, such that a damping characteristic of said vehicle suspension damper is automatically modified.

12. The vehicle suspension damper of claim 7, further comprising:
a fluid conduit; and
a reservoir cylinder in fluid communication with the cylinder via the fluid conduit,
the reservoir cylinder to receive and supply the working fluid as the piston assembly moves in and out of the cylinder.

13. The vehicle suspension damper of claim 12 wherein the reservoir cylinder is in fluid communication with a rebound portion of the cylinder via the fluid conduit.

14. A vehicle suspension damper comprising:
a cylinder and a piston assembly, wherein said piston assembly comprises a piston having a first side and a second side, said piston including a flow path formed through said piston;
a working fluid within said cylinder;
a bypass cylinder surrounding said cylinder and defining a cylindrical bypass channel, said cylindrical bypass channel fluidically coupling said first side of said piston and said second side of said piston, said cylindrical bypass channel providing a path for said working fluid to travel from said first side of said piston to said second side of said piston without traversing said flow path formed through said piston;
an active bypass valve coupled with said cylindrical bypass channel,
the active bypass valve having a flow path therethrough,
the active bypass valve automatically adjusts a meter of a flow of said working fluid through said cylindrical bypass channel, said active bypass valve configured to automatically adjust itself based on characteristics selected from the group consisting of:
vehicle characteristics, suspension characteristics, and received user input;
a reservoir cylinder in fluid communication with a rebound portion of the cylinder via a fluid conduit,
the reservoir cylinder to receive and supply the working fluid as the piston assembly moves in and out of the cylinder;
an active valve coupled with said fluid conduit,
the active valve having a flow path therethrough,
the active valve to automatically adjust a meter of a flow of said working fluid through said fluid conduit; and
an adjustable bypass port fluidly coupling an interior of said cylinder and said cylindrical bypass channel, wherein said active bypass valve further comprises:
an actuator arm;
a threaded plug coupled with said actuator arm, wherein said threaded plug is configured for being angularly displaced within said cylindrical bypass channel about a longitudinal axis of said threaded plug relative to said piston in response to an operation of said actuator arm; and
a rod disposed adjacent to said threaded plug, said rod configured for moving perpendicular to said longitudinal axis of said threaded plug and parallel to a center axis of said vehicle suspension damper in response to an angular displacement of said threaded plug.

15. The vehicle suspension damper of claim 14, wherein a first amount of said working fluid travels through said cylindrical bypass channel from said first side of said piston to said second side of said piston when said active bypass valve is in an open position; and
none of said working fluid travels through said cylindrical bypass channel from said first side of said piston to said second side of said piston when said active bypass valve is in a closed position.

16. The vehicle suspension damper of claim 15, wherein a lesser amount of said working fluid travels through said cylindrical bypass channel from said first side of said piston to said second side of said piston when said active bypass valve is in a partially open position.

17. The vehicle suspension damper of claim 14, further comprising:
a control system coupled to said active bypass valve, said control system comprising:
a sensor to obtain a vehicle acceleration sensor data associated with a movement of a vehicle component of said vehicle;
a comparer to compare a value of said vehicle acceleration sensor data with a predetermined acceleration threshold value that corresponds to said vehicle component;
an active bypass valve monitor to monitor a state of said active bypass valve, wherein said state controls a damping force within said vehicle suspension damper; and
an activation signal provider to, based on said comparing and said monitoring, actuate said active bypass valve to automatically adjust the meter of the flow of said working fluid through said cylindrical bypass channel, such that a damping characteristic of said vehicle suspension damper is automatically modified.

18. The vehicle suspension damper of claim 14, further comprising:
a control system coupled to said active valve, said control system comprising:
a sensor to obtain a vehicle acceleration sensor data associated with a movement of a vehicle component of said vehicle;
a comparer to compare a value of said vehicle acceleration sensor data with a predetermined acceleration threshold value that corresponds to said vehicle component;
an active valve monitor to monitor a state of said active valve, wherein said state controls a damping force within said vehicle suspension damper; and
an activation signal provider to, based on said comparing and said monitoring, actuate said active valve to automatically adjust the meter of the flow of said working fluid through said fluid conduit, such that a damping characteristic of said vehicle suspension damper is automatically modified.

\* \* \* \* \*